US010440254B2

(12) United States Patent
Kishida et al.

(10) Patent No.: US 10,440,254 B2
(45) Date of Patent: Oct. 8, 2019

(54) DISPLAY CONTROL DEVICE AND IMAGE PICKUP DEVICE

(71) Applicant: Mitsubishi Electric Corporation, Chiyoda-ku (JP)

(72) Inventors: Yukinori Kishida, Chiyoda-ku (JP); Nobuyuki Inokihara, Chiyoda-ku (JP); Yasuyuki Kasai, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/099,609

(22) PCT Filed: May 19, 2016

(86) PCT No.: PCT/JP2016/064904
§ 371 (c)(1),
(2) Date: Nov. 7, 2018

(87) PCT Pub. No.: WO2017/199398
PCT Pub. Date: Nov. 23, 2017

(65) Prior Publication Data
US 2019/0132507 A1 May 2, 2019

(51) Int. Cl.
*H04N 5/232* (2006.01)
*G03B 15/00* (2006.01)
(Continued)

(52) U.S. Cl.
CPC ......... *H04N 5/23212* (2013.01); *G03B 15/00* (2013.01); *G03B 17/00* (2013.01);
(Continued)

(58) Field of Classification Search
CPC ........ G03B 15/00; G03B 17/00; G03B 17/56; H04N 5/225; H04N 5/23212;
(Continued)

(56) References Cited
U.S. PATENT DOCUMENTS

2009/0230911 A1 9/2009 Kikuchi
2011/0103789 A1* 5/2011 Honjo .................... G02B 7/102
396/530
(Continued)

FOREIGN PATENT DOCUMENTS

JP 6-109102 A 4/1994
JP 2004-23580 A 1/2004
(Continued)

OTHER PUBLICATIONS

Office Action dated Jun. 25, 2019 in Japanese Patent Application No. 2018-518021 (with unedited computer generated English translation), 6 pages.
(Continued)

*Primary Examiner* — Amy R Hsu
(74) *Attorney, Agent, or Firm* — Oblon, McClelland, Maier & Neustadt, L.L.P.

(57) ABSTRACT

When a camera (10) turns in the reverse rotational direction toward a preset position, the camera (10) additionally turns in the reverse rotational direction by the number of offset pulses and then further turns in the forward rotational direction by the number of offset pulses. While the camera (10) turns in the forward rotational direction and the reverse rotational direction by the number of offset pulses, an image cutout unit (15) outputs image data corresponding to an area whose position in a photographing range of the camera (10) is moved in a direction of canceling the movement linked with the turning of the camera (10).

7 Claims, 28 Drawing Sheets

(51) Int. Cl.
  *G03B 17/00* (2006.01)
  *G03B 17/56* (2006.01)
  *H04N 5/225* (2006.01)
  *H04N 7/18* (2006.01)
  *H04N 5/262* (2006.01)

(52) U.S. Cl.
  CPC ............. *G03B 17/56* (2013.01); *H04N 5/225* (2013.01); *H04N 5/23299* (2018.08); *H04N 5/262* (2013.01); *H04N 7/18* (2013.01); *H04N 7/183* (2013.01)

(58) Field of Classification Search
  CPC ...... H04N 5/23299; H04N 5/262; H04N 7/18; H04N 7/183
  See application file for complete search history.

(56) References Cited

U.S. PATENT DOCUMENTS

| | | | | |
|---|---|---|---|---|
| 2012/0098971 A1* | 4/2012 | Hansen | ................ | H04N 5/2258 348/164 |
| 2013/0133168 A1* | 5/2013 | Yamaguchi | ........ | G01B 11/2416 29/407.04 |
| 2014/0293111 A1* | 10/2014 | Shintani | ............. | H04N 5/23293 348/333.09 |
| 2016/0055649 A1* | 2/2016 | Peret | ........................ | G01F 1/661 348/135 |
| 2016/0182863 A1* | 6/2016 | Watanabe | .............. | H04N 7/181 348/148 |
| 2017/0374290 A1* | 12/2017 | Ootorii | .................. | G03B 15/00 |

FOREIGN PATENT DOCUMENTS

| | | | |
|---|---|---|---|
| JP | 2005-303806 | A | 10/2005 |
| JP | 2005-303808 | A | 10/2005 |
| JP | 2008-169948 | A | 7/2008 |
| JP | 2009-194856 | A | 8/2009 |
| JP | 2009-222222 | A | 10/2009 |
| JP | 2009-244877 | A | 10/2009 |
| JP | 2009222222 | A * | 10/2009 |
| JP | 2010-237251 | A | 10/2010 |
| JP | 4723817 | B2 | 7/2011 |
| JP | 4932501 | B2 | 5/2012 |
| JP | 5074951 | B2 | 11/2012 |
| JP | 5350029 | B2 | 11/2013 |
| JP | 2014-7481 | A | 1/2014 |
| JP | 2015-12438 | A | 1/2015 |

OTHER PUBLICATIONS

International Search Report dated Jul. 19, 2016 in PCT/JP2016/064904 filed May 19, 2016.

* cited by examiner

DISPLAY CONTROL DEVICE AND IMAGE PICKUP DEVICE

TECHNICAL FIELD

The present invention relates to a display control device for displaying on a monitor an image photographed by a camera that is turned using a mechanism for transmitting rotational force by tooth engagement, such as a worm and a worm wheel.

BACKGROUND ART

In recent years, so-called network cameras are installed, which are controlled by remote operation via a network or a dedicated line and capture images for the purpose of grasping the situation of roads or rivers, preventing crimes, and the like. In such a camera, improvement of image quality for photographing clearer images, and increase of magnification, that is, increase of zooming for photographing farther, are progressing. There are also a fixed type camera for photographing only in one direction, and a turning type camera capable of panning that is rotation in the horizontal direction or tilting that is rotation in the vertical direction.

The turning type camera often has a preset function. The preset function is a function for automatically turning the camera to a pre-registered preset position and performing photographing. In such a function, to accurately stop the camera at the registered position, high stop position accuracy is required of a mechanism for turning the camera. In addition, in a camera having a zoom function, since the ratio of the turning angle to the angle of view is relatively large, the importance of the stop position accuracy is high.

The stop position accuracy of the mechanism for turning the camera will be described with reference to a pan turning mechanism illustrated in FIGS. 29 to 34. This pan turning mechanism includes a worm 33 to which a pan motor 32 is attached, and a worm wheel 34 to which a camera 10 is attached.

FIG. 30 is a diagram of the pan turning mechanism of FIG. 29 as viewed from a direction A in the figure. The teeth of the worm 33 engage with the teeth of the worm wheel 34, and the pan motor 32 rotates in the forward rotational direction or the reverse rotational direction, whereby the camera 10 is turned to a desired position.

FIG. 31 is a diagram illustrating the engagement between the teeth of the worm 33 and the teeth of the worm wheel 34. In the pan turning mechanism transmitting the rotational force by tooth engagement, to prevent a load from being increased by interference between the teeth due to the distance between the shafts, manufacturing errors, and the like, a backlash, that is, a gap between the gears is necessary. In this figure, a total number of teeth of the worm wheel 34 is 120, and a tooth angle 34a is 3 degrees. In addition, the backlash, that is, a gap 33a+a gap 33b is 0.03 degrees. Each angle of the tooth angle 34a, and the gaps 33a and 33b indicates an angle as viewed from the rotation center of the worm wheel 34.

FIG. 32 is a diagram illustrating engagement when the worm 33 is rotated forward. The teeth of the worm 33 and the teeth of the worm wheel 34 come into contact with each other on the gap 33a side, whereby the worm wheel 34 rotates in the forward rotational direction.

FIG. 33 is a diagram illustrating engagement when the worm 33 is rotated reversely. In contrast with the forward rotation, in the reverse rotation, the teeth of the worm 33 and the teeth of the worm wheel 34 come in contact with each other on the opposite gap 33b side, whereby the worm wheel 34 rotates in the reverse rotational direction.

With reference to FIG. 34, a phenomenon will be described in which a stop position error occurs in a mechanism transmitting rotational force by such tooth engagement. When the worm wheel 34 is rotated by 270 degrees in the forward rotational direction from a current position and then the worm wheel 34 is rotated by 270 degrees in the reverse rotational direction from that position, the worm wheel returns to the same position fundamentally. However, in the case of a configuration in which the worm wheel 34 is rotated by rotating the worm 33, when the worm 33 is rotated in the forward rotational direction from the engagement state illustrated in FIG. 32 and then rotated in the reverse rotational direction, the worm wheel 34 fails to rotate by degrees corresponding to a space of the gap 33a+the gap 33b. An angular error occurs in the worm wheel 34 by the space, and thus when the rotational operation of 270 degrees is completed in the reverse rotational direction, a stop position error occurs by the space of the gap 33a+the gap 33b in the forward rotational direction from the initial current position. In this illustrated example, the stop position error is 0.03 degrees. Note that, the stop position error due to the backlash as described above occurs not only in panning but also in tilting.

In view of the occurrence of such a stop position error, for example, Patent Literature 1 discloses an image pickup device for preparing a stop position correction value table in which a stop position error amount that is calculated or measured in advance is set, and adjusting a cutout position in a photographed image by using the table. As a result, an image in which the stop position error is reduced can be used as a display image.

CITATION LIST

Patent Literatures

Patent Literature 1: JP 2014-7481 A

SUMMARY OF INVENTION

Technical Problem

However, the technique described in Patent Literature 1 merely reduces the stop position error apparently, and an actual stop position of the camera has remained deviating from a desired position, for example, a preset position. To eliminate the deviation of the stop position of the camera itself, it is necessary to additionally perform fine adjustment of the camera position. However, it is not preferable that a satisfactory image cannot be provided to a user due to shaking of the image displayed during the fine adjustment.

The present invention has been made to solve problems as described above, and it is an object to provide a display control device capable of providing a satisfactory image by reducing shaking of the image displayed when the stop position accuracy of a camera is improved.

Solution to Problem

A display control device according to the present invention includes: an image cutout unit for outputting image data corresponding to a partial area of a photographing range of a camera, the camera being turned by rotational force transmitted by tooth engagement in a rotational force transmission mechanism in a first rotational direction used for regulating a position of the camera and a second rotational direction opposite to the first rotational direction; a cutout position calculating unit for calculating an amount of movement of the photographing range corresponding to an amount of turning of the camera; and a display controlling unit for displaying an image indicated by the image data corresponding to the area, in which the image cutout unit, until the camera turning in the second rotational direction reaches a first position, outputs image data corresponding to the area whose position in the photographing range is fixed at a set position; from when the camera reaches the first position and then further turns in the second rotational direction by a set angle and further turns in the first rotational direction by the set angle until the camera reaches a second position, outputs image data corresponding to the area whose position in the photographing range is moved in a direction of canceling movement of the area linked with turning of the camera by using the amount of movement calculated by the cutout position calculating unit; and when the camera reaches the second position, outputs image data corresponding to the area whose position in the photographing range is fixed at the set position.

Advantageous Effects of Invention

According to the present invention, shaking can be reduced of the image displayed when the stop position accuracy of the camera is improved.

DESCRIPTION OF EMBODIMENTS

Hereinafter, to explain the present invention in more detail, embodiments for carrying out the present invention will be described with reference to the accompanying drawings.

First Embodiment

Figure 1:
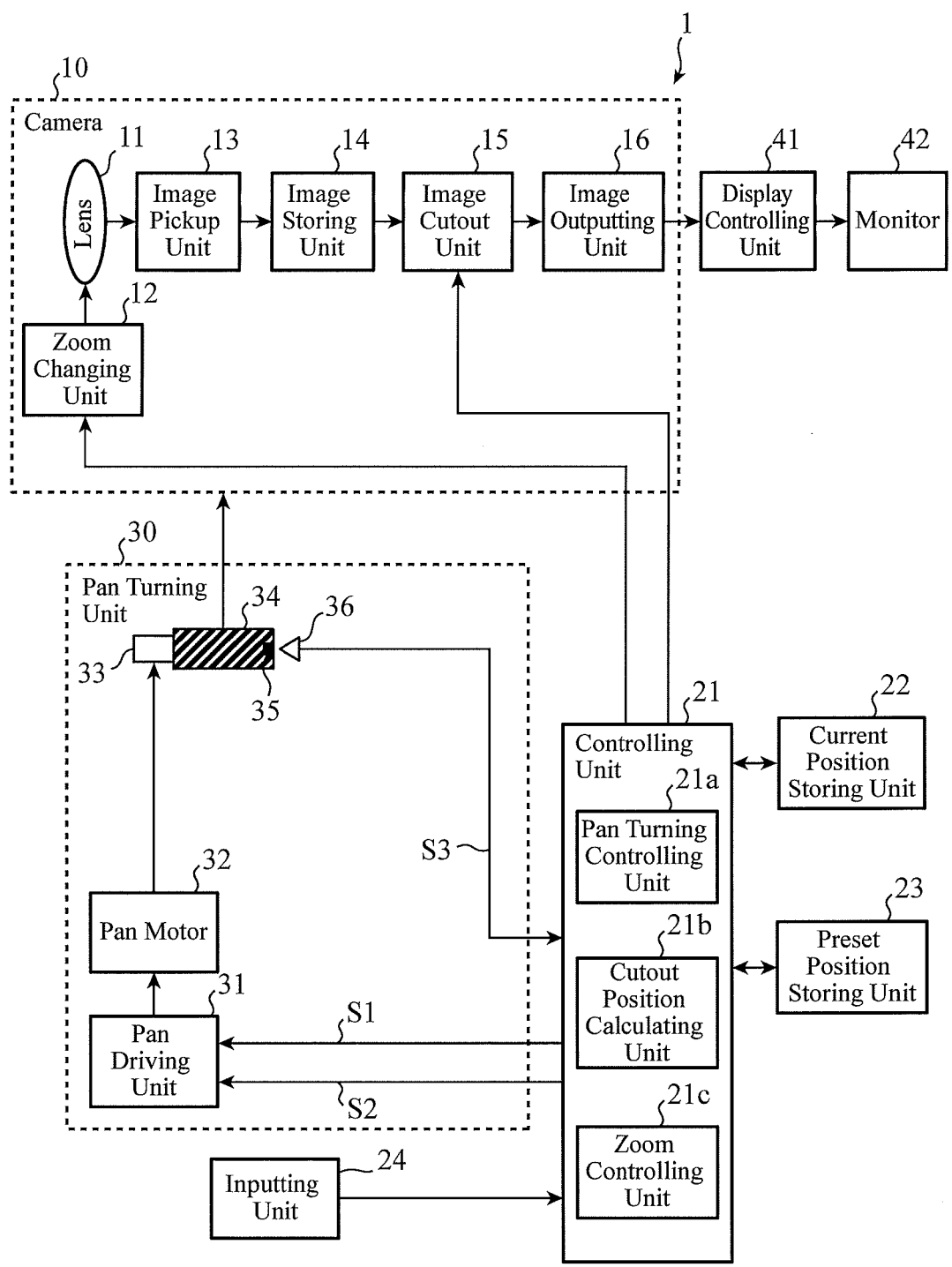
FIG. 1 is a configuration diagram of an image pickup device according to a first embodiment of the present invention.

FIG. 1 is a configuration diagram of an image pickup device 1 according to a first embodiment of the present invention. The image pickup device 1 according to the first embodiment is used for monitoring, for example.

The image pickup device 1 includes a camera 10, a controlling unit 21, a current position storing unit 22, a preset position storing unit 23, an inputting unit 24, a pan turning unit 30, a display controlling unit 41, and a monitor 42.

The camera 10 for photographing an image is attached to a worm wheel 34 of the pan turning unit 30 and rotates integrally with the worm wheel 34. The camera 10 includes a lens 11, a zoom changing unit 12, an image pickup unit 13, an image storing unit 14, an image cutout unit 15, and an image outputting unit 16.

The zoom changing unit 12 changes a zoom value of the camera 10 by changing a zoom value of the lens 11. The zoom changing unit 12 is, for example, a mechanism for changing distance between a plurality of lenses by moving the plurality of lenses configuring the lens 11.

The image pickup unit 13 converts a subject image formed by the lens 11 into image data and outputs the image data to the image storing unit 14. The image pickup unit 13 includes an image pickup element using a charge coupled device (CCD) system, a complementary metal oxide semiconductor (CMOS) system, or the like.

The image storing unit 14 stores the image data output by the image pickup unit 13. The image storing unit 14 includes one of various memories similarly to a memory 101 described later.

The image cutout unit 15 cuts out a part of the image data stored in the image storing unit 14 and outputs the part of the image data to the image outputting unit 16. As a result, only image data corresponding to a partial area of the photographing range of the camera 10 is output to the image outputting unit 16.

The image outputting unit 16 is an image output interface for outputting the image data output by the image cutout unit 15 to the display controlling unit 41.

The display controlling unit 41 controls the monitor 42 to display on the monitor 42 an image indicated by the image data output by the image cutout unit 15 via the image outputting unit 16. The monitor 42 is, for example, a liquid crystal display.

The controlling unit 21 controls each component of the image pickup device 1, such as the camera 10, and the pan turning unit 30. The controlling unit 21 includes a pan turning controlling unit 21a, a cutout position calculating unit 21b, and a zoom controlling unit 21c.

The pan turning controlling unit 21a outputs a signal instructing a pan driving unit 31 to rotate and stop a pan motor 32. This signal is a forward and reverse rotation signal S1, a turning pulse signal S2, or the like. In addition, the pan turning controlling unit 21a performs, for example, storing and reading of a position of the camera 10, and storing and reading of a preset position, using the current position storing unit 22 and the preset position storing unit 23.

The cutout position calculating unit 21b indicates a cutout position to the image cutout unit 15. At that time, an amount is calculated of movement of the photographing range of the camera 10 due to turning of the camera 10, as necessary.

The zoom controlling unit 21c outputs, to the zoom changing unit 12, a signal instructing the zoom changing unit 12 to operate, and thereby sets the zoom value.

In the current position storing unit 22, a current position of the camera 10 is stored by the pan turning controlling unit 21a. The current position storing unit 22 includes one of various memories similarly to the memory 101 described later.

In the preset position storing unit 23, the preset position of the camera 10 is stored by the pan turning controlling unit 21a. The preset position is stored when the preset position is registered by a user instruction signal via the inputting unit 24. The preset position storing unit 23 includes one of various memories similarly to the memory 101 described later.

The inputting unit 24 accepts user's operation and outputs the user instruction signal to the controlling unit 21. The inputting unit 24 is, for example, an operation button.

The pan turning unit 30 is a mechanism for turning the camera 10 in the pan direction under the control of the controlling unit 21. The pan turning unit 30 includes the pan driving unit 31, the pan motor 32, a worm 33, the worm wheel 34, an origin generating unit 35, and an origin detecting unit 36.

The pan driving unit 31 is a driver for controlling a driving voltage and a driving current supplied to the pan motor 32 in accordance with the forward and reverse rotation signal S1 and the turning pulse signal S2 output by the pan turning controlling unit 21a.

The pan motor 32 rotates by the driving voltage and the driving current supplied from the pan driving unit 31. The pan motor 32 is, for example, a stepping motor.

The worm 33 is attached to the output shaft of the pan motor 32 and rotates integrally with the output shaft.

The worm wheel 34 engages with the worm 33 and rotates along with rotation of the worm 33. The camera 10 is attached to the worm wheel 34, and thus rotational force generated by the pan motor 32 is transmitted to the camera 10 by tooth engagement between the worm 33 and the worm wheel 34, and thus the camera 10 turns. The worm 33 and the worm wheel 34 configure a rotational force transmission mechanism.

The origin generating unit 35 is attached to a freely-selected position that does not affect the engagement between the worm 33 and the worm wheel 34 on the outer peripheral surface that is a side surface on which the teeth of the worm wheel 34 are formed.

The origin detecting unit 36 detects the position of the origin generating unit 35 and outputs an origin detecting signal S3 to the pan turning controlling unit 21a of the controlling unit 21. The origin detecting unit 36 is fixed in the vicinity of the worm wheel 34 by a support mechanism (not illustrated).

The origin generating unit 35 includes, for example, a sheet metal having a slit, and the origin detecting unit 36 includes, for example, a photo-interrupter. Then, by passing the sheet metal having the slit between the light-emitting unit and the light-receiving unit of the photo-interrupter, the origin detecting unit 36 detects the origin generating unit 35. In addition to this, a known object detection method using a magnetic sensor, a relay, or the like may be applied.

In the first embodiment, a display control device is configured by the image cutout unit 15, the cutout position calculating unit 21b, and the display controlling unit 41. In addition, instead of the configuration illustrated in FIG. 1, a single display control device may be configured by the image cutout unit 15, the cutout position calculating unit 21b, and the display controlling unit 41, and communicably connected to the monitor 42 and also to the camera 10 and the controlling unit 21 both of which are configured by excluding the components of the single display control device.

Functions of the pan turning controlling unit 21a, the cutout position calculating unit 21b, and the zoom controlling unit 21c of the controlling unit 21, and functions of the image cutout unit 15, and the display controlling unit 41 are implemented by a processing circuit. The processing circuit may be dedicated hardware, or a central processing unit (CPU) that executes a program stored in a memory. The CPU is also referred to as a central processing device, a processing device, an arithmetic device, a microprocessor, a microcomputer, a processor, or a digital signal processor (DSP).

Figure 2A:
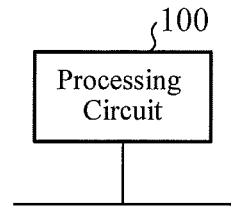
FIGS. 2A and 2B are diagrams each illustrating a hardware configuration example of a controlling unit in the first embodiment of the present invention.

FIG. 2A is a diagram illustrating a hardware configuration example in a case where the functions of the units of the controlling unit 21 are implemented by a processing circuit 100 that is dedicated hardware. Examples of the processing circuit 100 include a single circuit, a composite circuit, a programmed processor, a parallel-programmed processor, an application specific integrated circuit (ASIC), a field-programmable gate array (FPGA), or a combination thereof. The functions of the pan turning controlling unit 21a, the cutout position calculating unit 21b, and the zoom controlling unit 21c may be implemented by combining separate processing circuits 100, or the functions may be implemented by one processing circuit 100.

The image cutout unit 15 and the display controlling unit 41 can also be implemented by a hardware configuration similar to that of the controlling unit 21 illustrated in FIG. 2A.

Figure 2B:
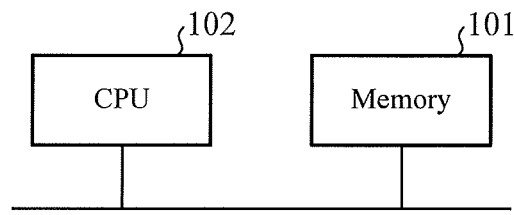

FIG. 2B is a diagram illustrating a hardware configuration example in a case where the functions of the units of the controlling unit 21 are implemented by a CPU 102 that executes a program stored in the memory 101. In this case, the functions of the pan turning controlling unit 21a, the cutout position calculating unit 21b, and the zoom controlling unit 21c are implemented by software, firmware, or a combination of software and firmware. The software and the firmware are described as programs and stored in the memory 101. The CPU 102 reads and executes the program stored in the memory 101, thereby implementing the functions of the units of the controlling unit 21. That is, the controlling unit 21 includes the memory 101 for storing programs and the likes that cause steps illustrated in the flowcharts of FIGS. 3, 5, 7 and 10 described later to be executed resultantly. In addition, it can also be said that these programs cause a computer to execute procedures or methods of the units of the controlling unit 21. Here, examples of the memory 101 include a nonvolatile or volatile semiconductor memory such as RAM, ROM, flash memory, erasable programmable ROM (EPROM), and electrically erasable programmable ROM (EEPROM), a magnetic disk, a flexible disk, an optical disk, a compact disk, a mini disk, a digital versatile disc (DVD), and the like.

The image cutout unit 15 and the display controlling unit 41 can also be implemented by a hardware configuration similar to that of the controlling unit 21 illustrated in FIG. 2B.

Note that, the functions of the units of the controlling unit 21 may be partly implemented by dedicated hardware and partly implemented by software or firmware. For example, for the pan turning controlling unit 21a and the cutout position calculating unit 21b, each function can be implemented by a processing circuit as the dedicated hardware, and for the zoom controlling unit 21c, a processing circuit can implement the function by reading and executing the program stored in the memory.

As described above, the processing circuit can implement the functions of the controlling unit 21, the image cutout unit 15, and the display controlling unit 41 by hardware, software, firmware, or a combination thereof.

Next, an example will be described of processing performed by the image pickup device 1 configured as described above.

Figure 3:
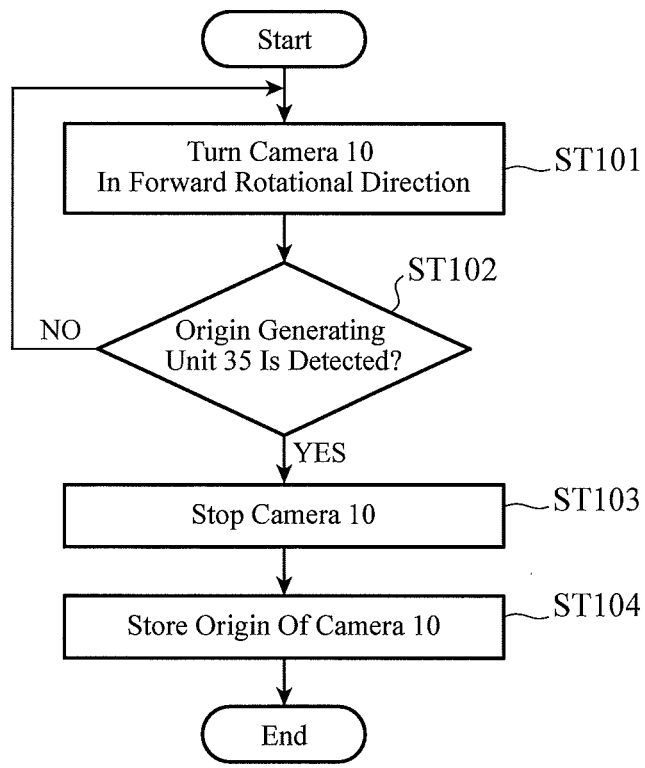
FIG. 3 is a flowchart illustrating processing performed by the image pickup device according to the first embodiment of the present invention.
Figure 4:
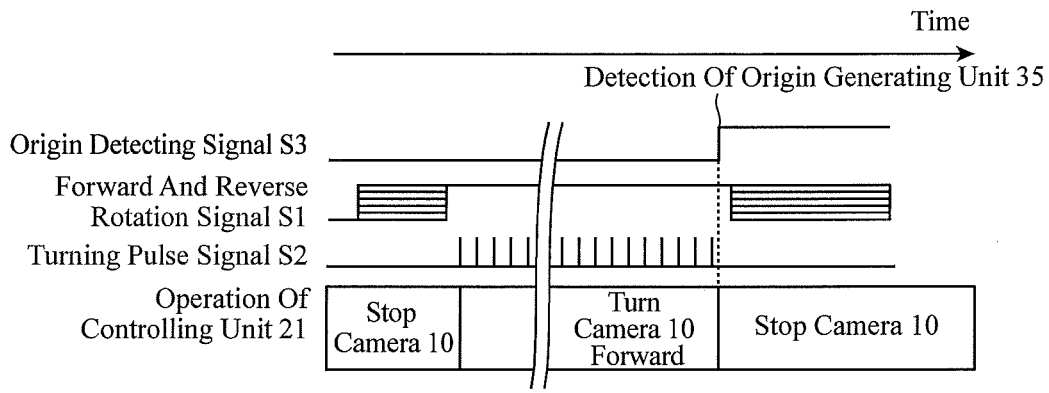
FIG. 4 is a timing chart corresponding to the flowchart of FIG. 3.

First, with reference to the flowchart illustrated in FIG. 3 and the timing chart illustrated in FIG. 4, an example will be described of the processing for detection of the origin of the turning of the camera 10, that is, the reference point of the turning operation.

For example, when the power supply of the camera 10 is turned on, the pan turning controlling unit 21a turns the camera 10 in the forward rotational direction (step ST101). Specifically, as illustrated in FIG. 4, the pan turning controlling unit 21a sets the forward and reverse rotation signal S1 output to the pan driving unit 31 to the H level, and then outputs the turning pulse signal S2 to the pan driving unit 31. Then, the pan driving unit 31 supplies the driving voltage and the driving current to the pan motor 32, and the pan motor 32 rotates in steps in accordance with the number of pulses of the turning pulse signal S2. The rotational force output by the pan motor 32 is transmitted to the worm wheel 34 via the worm 33, and thus the camera 10 turns in the forward rotational direction.

Here, the description will be made below assuming that, for example, one pulse is the number of pulses of the turning pulse signal S2 required for turning the camera 10 by 0.05 degrees. In this case, to turn the camera 10 by 90 degrees, the pan turning controlling unit 21a needs to output the turning pulse signal S2 to the pan driving unit 31 by 1800 pulses.

When the output of the turning pulse signal S2 is started, the pan turning controlling unit 21a subsequently determines whether the origin generating unit 35 is detected by using the origin detecting signal S3 output by the origin detecting unit 36 (step ST102).

The origin generating unit 35 is attached to the worm wheel 34 rotating for turning the camera 10, and rotates integrally with the worm wheel 34. Then, when the origin generating unit 35 passes through the vicinity of the origin detecting unit 36, the origin detecting unit 36 changes the origin detecting signal S3 output to the pan turning controlling unit 21a from the L level to the H level, as illustrated in FIG. 4. Then, the pan turning controlling unit 21a determines that the origin generating unit 35 is detected (step ST102; YES), stops outputting the turning pulse signal S2 to stop rotation of the pan motor 32, thus stopping the turning of the camera 10 also (step ST103).

On the other hand, when the origin detecting signal S3 remains at the L level, that is, the origin generating unit 35 is not detected (step ST102; NO), the processing returns to step ST101, and the pan turning controlling unit 21a continues outputting the turning pulse signal S2.

Subsequently, the pan turning controlling unit 21a defines a position of the camera 10 in a state in which the origin generating unit 35 is detected and the turning is stopped, as the origin of the turning of the camera 10. Specifically, the pan turning controlling unit 21a stores, in the current position storing unit 22, the current position of the camera 10 as 0 degrees indicating the origin (step ST104). Thereafter, the turning operation and the turning angle of the camera 10 are processed with reference to this origin.

Next, with reference to the flowchart illustrated in FIG. 5 and the timing chart illustrated in FIG. 6, an example will be described of the processing for the registration of the preset position.

First, the pan turning controlling unit 21a determines whether the user instructs to register the current position of the camera 10 as the preset position by using the user instruction signal output by the inputting unit 24 (step ST111).

When the user does not instruct to register the current position of the camera 10 as the preset position (step ST111; NO), the pan turning controlling unit 21a determines whether the user instructs to turn the camera 10 by using the user instruction signal output by the inputting unit 24 (step ST112).

When the user does not instruct to turn the camera 10 (step ST112; NO), the processing returns to step ST111.

On the other hand, when the user instructs to turn the camera 10 (step ST112; YES), as illustrated in FIG. 6, the pan turning controlling unit 21a sets the forward and reverse rotation signal S1 output to the pan driving unit 31 to the H level, and then outputs the turning pulse signal S2 to the pan driving unit 31 to turn the camera 10 in the forward rotational direction (step ST113).

Subsequently, the pan turning controlling unit 21a stores the current position of the camera 10 in the current position storing unit 22 in accordance with the number of pulses of the output turning pulse signal S2 (step ST114). At this time, the camera 10 turns in the forward rotational direction by the number of pulses of the turning pulse signal S2 with the origin stored in step ST104 of FIG. 3 as the reference, that is, 0 degrees. Therefore, for example, in a case where the camera 10 turns by 0.05 degrees with one pulse of the turning pulse signal S2, when the camera 10 is at the origin and then 100 pulses of the turning pulse signal S2 are output to the pan driving unit 31, the camera 10 turns 5 degrees in the forward rotational direction from the origin. The pan turning controlling unit 21a calculates the turning angle of the camera 10 using the number of output pulses, and stores the angle in the current position storing unit 22 as the current position of the camera 10. In this way, the current position storing unit 22 always stores an angle indicating a position of the camera 10 at the present time.

After step ST114, the processing returns to step ST111. Then, when the user instructs to register the current position of the camera 10 as the preset position (step ST111; YES), the pan turning controlling unit 21a stops outputting the turning pulse signal S2 to stop rotation of the pan motor 32, thus stopping the turning of the camera 10 also. Then, the pan turning controlling unit 21a reads the current position of the stopped camera 10 stored in the current position storing unit 22, and stores the read current position as the preset position of the camera 10 in the preset position storing unit 23 (step ST115).

Figure 5:
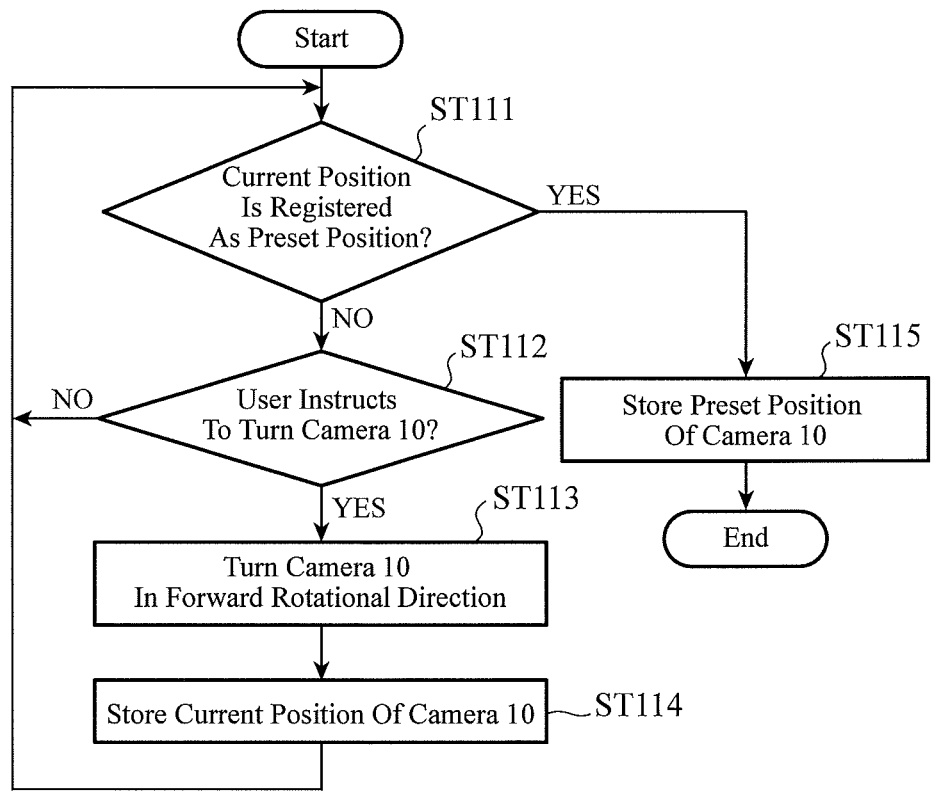
FIG. 5 is a flowchart illustrating processing performed by the image pickup device according to the first embodiment of the present invention.
Figure 6:
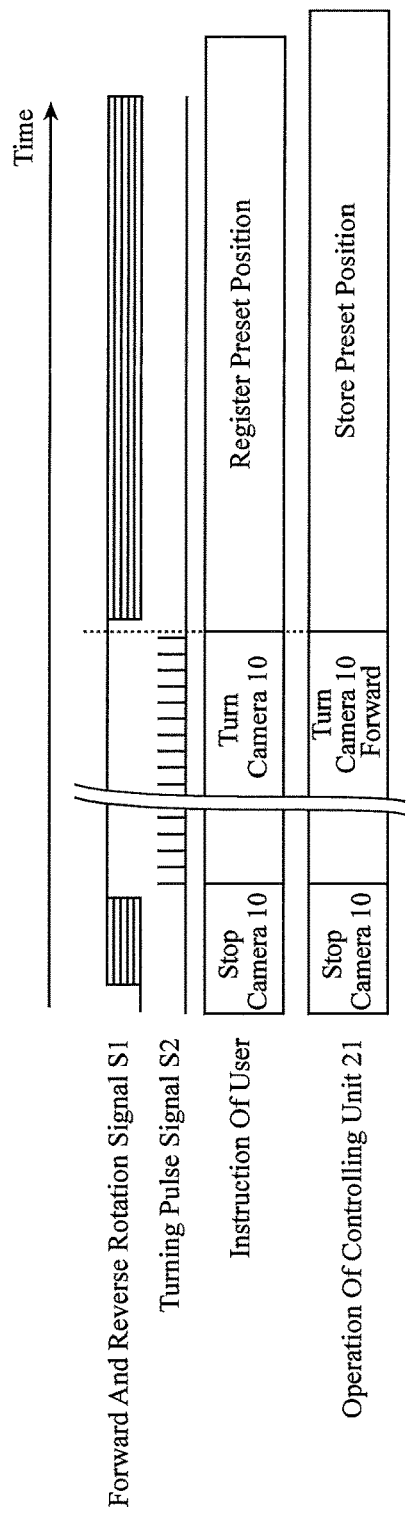
FIG. 6 is a timing chart corresponding to the flowchart of FIG. 5.

Note that, a plurality of preset positions may be registered, and in that case, it is sufficient that a series of processing steps illustrated in FIG. 5 is repeatedly performed.

Next, an example will be described of processing in preset operation.

First, with reference to the flowchart illustrated in FIG. 7 and the timing chart illustrated in FIG. 9, the preset operation will be described in a case where the current position of the camera 10 is 30 degrees and a preset position A is 120 degrees as illustrated in the state diagram of FIG. 8.

When the user inputs an instruction to turn the camera 10 from the current position to the preset position A via the inputting unit 24 to the controlling unit 21, the cutout position calculating unit 21b indicates a cutout position for image data stored in the image storing unit 14 to the image cutout unit 15 (step ST120). The image data stored in the image storing unit 14 is all image data corresponding to the photographing range that can also be said to be the angle of view of the camera 10 at photographing. Therefore, the image data cut out by the image cutout unit 15 is image data corresponding to a partial area of the photographing range of the camera 10. That is, the cutout position calculating unit 21b substantially indicates a position of the area in the photographing range of the camera 10 to the image cutout unit 15.

Figure 14A:
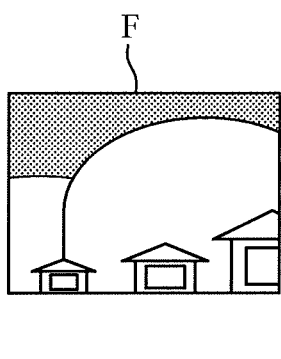
FIGS. 14A, 14B, and 14C are diagrams illustrating a concept of processing performed by a cutout position calculating unit and an image cutout unit in the first embodiment of the present invention.
Figure 14B:
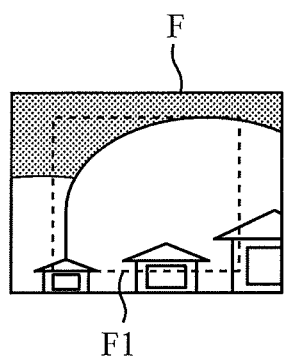
Figure 14C:
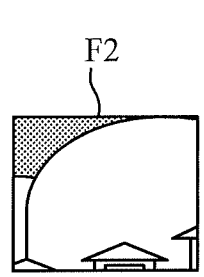

Images in FIGS. 14A to 14C illustrate a concept of processing performed by the cutout position calculating unit 21b and the image cutout unit 15.

FIG. 14A illustrates an image F indicated by image data output by the image pickup unit 13, that is, scenery that falls within the photographing range of the camera 10. In the image storing unit 14, the image data indicating the image F is stored by the image pickup unit 13.

FIG. 14B illustrates an image portion F1 corresponding to the cutout position indicated by the cutout position calculating unit 21b for the image F. The cutout position calculating unit 21b sets the cutout position for the image data stored in the image storing unit 14 so that the center of the image portion F1 coincides with the center of the image F, for example.

FIG. 14C illustrates an image F2 indicated by image data output by the image cutout unit 15. The image F2 coincides with the image portion F1 in FIG. 14B. The image cutout unit 15 cuts out the image data indicated by the cutout position calculating unit 21b from the image data stored in the image storing unit 14, and outputs the image data which is cut out. In this case, the image F2 is displayed on the monitor 42 by the display controlling unit 41.

Figure 15A:
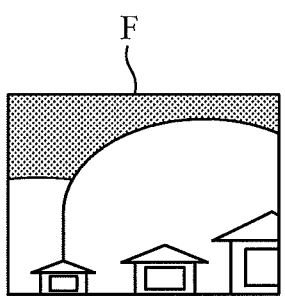
FIGS. 15A, 15B, and 15C are diagrams illustrating a concept of processing performed by the cutout position calculating unit and the image cutout unit in the first embodiment of the present invention.
Figure 15B:
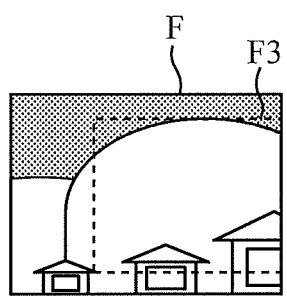
Figure 15C:
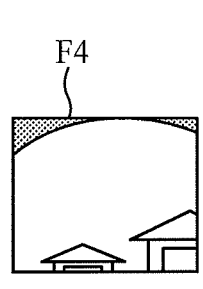

Images in FIGS. 15A to 15C illustrate a concept of processing performed by the cutout position calculating unit 21b and the image cutout unit 15, and are in a case where the cutout position is different from that of FIGS. 14A to 14C.

FIG. 15A is a diagram similar to FIG. 14A.

FIG. 15B illustrates an image portion F3 corresponding to the cutout position indicated by the cutout position calculating unit 21b for the image F similarly to FIG. 14B. The cutout position calculating unit 21b sets the cutout position for the image data stored in the image storing unit 14 so that the right edge of the image portion F3 in the figure coincides with the right edge of the image F, for example.

FIG. 15C illustrates an image F4 indicated by image data output by the image cutout unit 15 similarly to FIG. 14C. The image F4 coincides with the image portion F3 in FIG. 15B. The image cutout unit 15 cuts out the image data indicated by the cutout position calculating unit 21b from the image data stored in the image storing unit 14, and outputs the image data which is cut out. In this case, the image F4 is displayed on the monitor 42 by the display controlling unit 41.

It is sufficient that whether the image is cut out at the position as illustrated in FIGS. 14A to 14C or cut out at the position as illustrated in FIGS. 15A to 15C is set at the time of initial setting of the image pickup device 1 by the user, or the like. As illustrated in FIGS. 14A to 14C, when the central portion is cut out, a monitored object appears in the center of the photographing range of the camera 10, so that it is easy to use as monitoring work.

The description will be made below assuming that the cutout position illustrated in FIGS. 14A to 14C is indicated by the cutout position calculating unit 21b in step ST120. This indication in step ST120 is maintained until the cutout position is changed later by the cutout position calculating unit 21b.

Subsequently, the pan turning controlling unit 21a acquires the current position of the camera 10 from the current position storing unit 22 (step ST121). Assuming that the current position is Xc degrees, Xc at this time is 30.

Subsequently, the pan turning controlling unit 21a acquires the preset position A stored in the preset position storing unit 23 (step ST122) Assuming that the preset position is X degrees, X at this time is 120.

Subsequently, the pan turning controlling unit 21a calculates the turning direction and the turning angle by using Xc and X (step ST123). As illustrated in FIG. 8, in this example, since the camera 10 is turned from the current position of 30 degrees to the preset position A of 120 degrees, the turning direction is set to the forward rotational direction and the turning angle is set to 90 degrees. This is because the preset position A is reached in a short time by turning the camera 10 in the forward rotational direction instead of the reverse rotational direction.

Subsequently, the pan turning controlling unit 21a determines whether the calculated turning direction is the forward rotational direction (step ST124). In this example, since the forward rotational direction is set (step ST124; YES), the processing in steps ST125 and ST126 is subsequently performed. Since the processing in steps ST125 and ST126 is similar to that in steps ST113 and ST114 of FIG. 5 already described, the description thereof is omitted.

Subsequently, the pan turning controlling unit 21a determines whether the turning pulse signal S2 has been output by the number of pulses required (step ST127). In this example, it is determined whether 1800 pulses have been output required for turning the camera 10 by 90 degrees.

When the turning pulse signal S2 has not been output by the number of pulses required (step ST127; NO), the processing returns to step ST125.

On the other hand, when the turning pulse signal S2 has been output by the number of pulses required (step ST127; YES), the pan turning controlling unit 21a stops outputting the turning pulse signal S2 as illustrated in FIG. 9, thus stopping the turning of the camera 10 (step ST128). At this time, the camera 10 has reached the preset position A.

Figure 7:
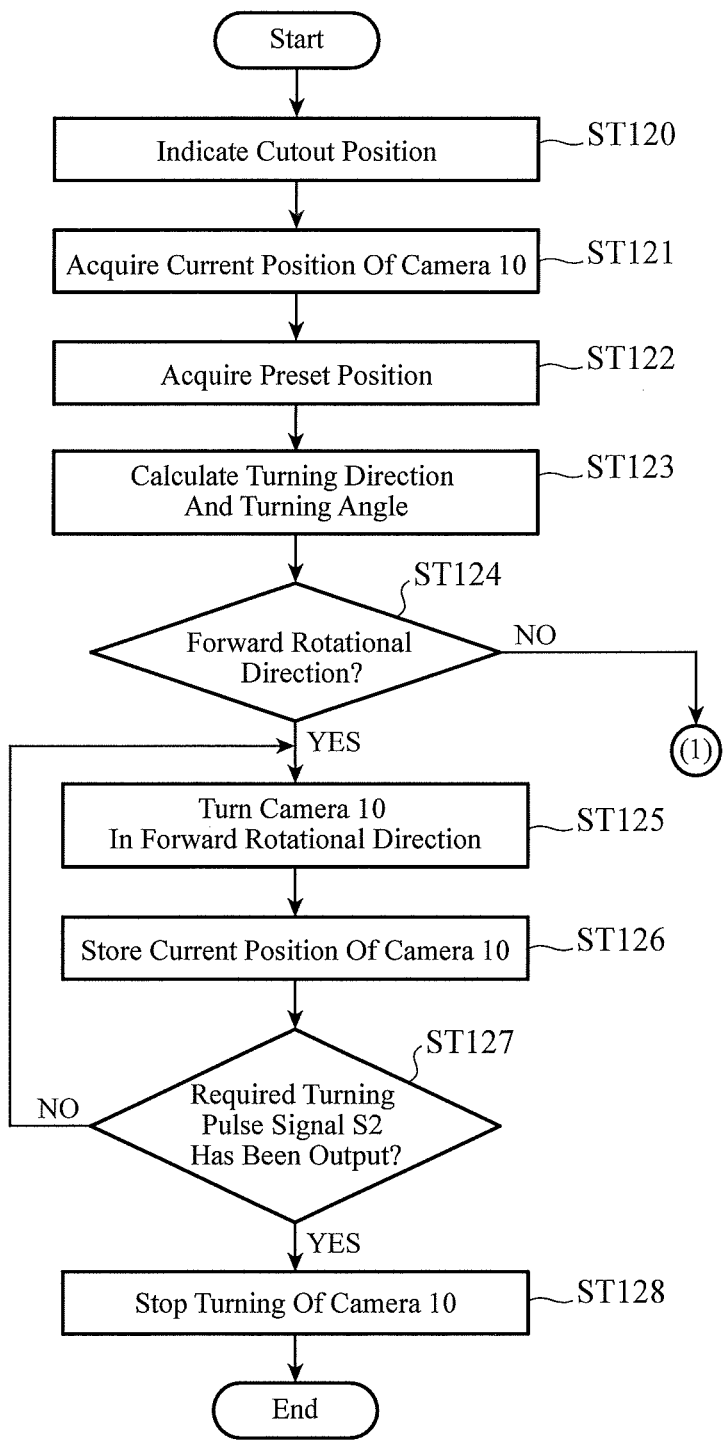
FIG. 7 is a flowchart illustrating processing performed by the image pickup device according to the first embodiment of the present invention.
Figure 16:
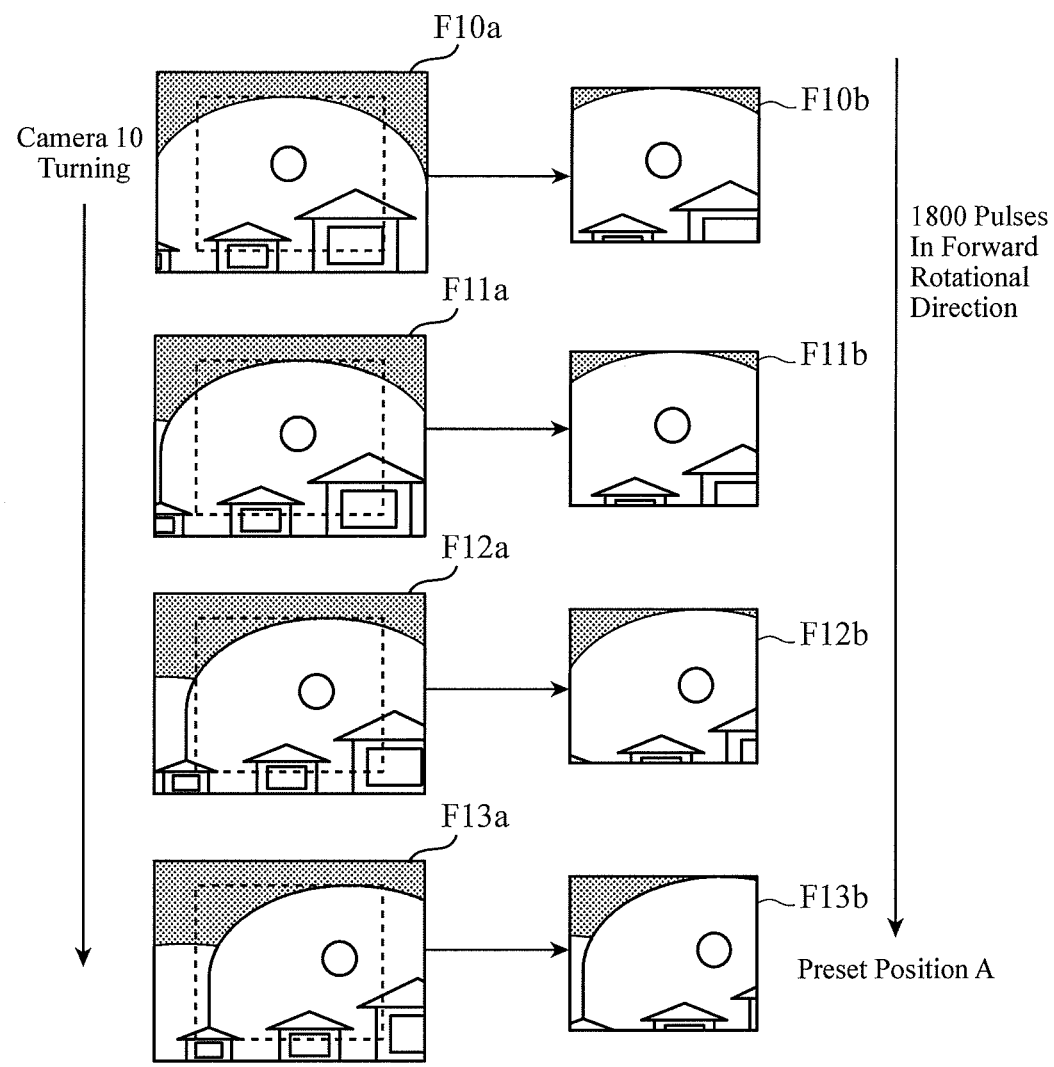
FIG. 16 is a diagram illustrating images corresponding to the flowchart of FIG. 7.

FIG. 16 illustrates images F10a to F13a indicated by image data stored in the image storing unit 14, and images F10b to F13b indicated by image data output by the image cutout unit 15 during the processing illustrated in FIG. 7.

When the camera 10 turns toward the preset position A, the range of the scenery in the images F10a to F13a also moves accordingly. In addition, in step ST120, the cutout position for the image data stored in the image storing unit 14 is set to the position illustrated in FIGS. 14A to 14C, and the range of the scenery in the images F10b to F13b also moves. Then, when the camera 10 reaches the preset position A, the image F13b photographed at the preset position A is displayed on the monitor 42 by the display controlling unit 41.

The position of the origin is determined in a state in which the camera 10 is turned in the forward rotational direction. Similarly, the preset position is registered in the state in which the camera 10 is turned in the forward rotational direction. That is, the forward rotational direction is a first rotational direction used for regulating the position of the camera 10. For this reason, the position of the camera 10 turned in the forward rotational direction to reach the preset position A in step ST128, is accurately the preset position A without being affected by a backlash occurring between the worm 33 and the worm wheel 34. Therefore, the image displayed on the monitor 42 by the display controlling unit 41 by using the image data output by the image cutout unit 15 is also an accurate image photographed at the preset position A.

Next, with reference to the flowcharts illustrated in FIGS. 7 and 10, and the timing chart illustrated in FIG. 12, another example will be described of the preset operation in a case where the current position of the camera 10 is 30 degrees and a preset position B is 300 degrees as illustrated in the state diagram of FIG. 11.

When the user inputs an instruction to turn the camera 10 from the current position to the preset position B via the inputting unit 24 to the controlling unit 21, the cutout position calculating unit 21b indicates the cutout position for the image data stored in the image storing unit 14 to the image cutout unit 15 (step ST120). Here again, the description will be made below assuming that the cutout position illustrated in FIGS. 14A to 14C is indicated by the cutout position calculating unit 21b in step ST120.

Subsequently, the pan turning controlling unit 21a acquires the current position of the camera 10 from the current position storing unit 22 (step ST121). Assuming that the current position is Xc degrees, Xc at this time is 30.

Subsequently, the pan turning controlling unit 21a acquires the preset position B stored in the preset position storing unit 23 (step ST122). Assuming that the preset position is X degrees, X at this time is 300.

Subsequently, the pan turning controlling unit 21a calculates the turning direction and the turning angle by using Xc and X (step ST123). As illustrated in FIG. 11, in this example, since the camera 10 is turned from the current position of 30 degrees to the preset position B of 300 degrees, the turning direction is set to the reverse rotational direction and the turning angle is set to 90 degrees. This is because the preset position B is reached in a short time by turning the camera 10 in the reverse rotational direction instead of the forward rotational direction.

Subsequently, the pan turning controlling unit 21a determines whether the calculated turning direction is the forward rotational direction (step ST124). In this example, since the reverse rotational direction is set (step ST124: NO), the processing in step ST130 illustrated in FIG. 10 is subsequently performed.

Figure 31:
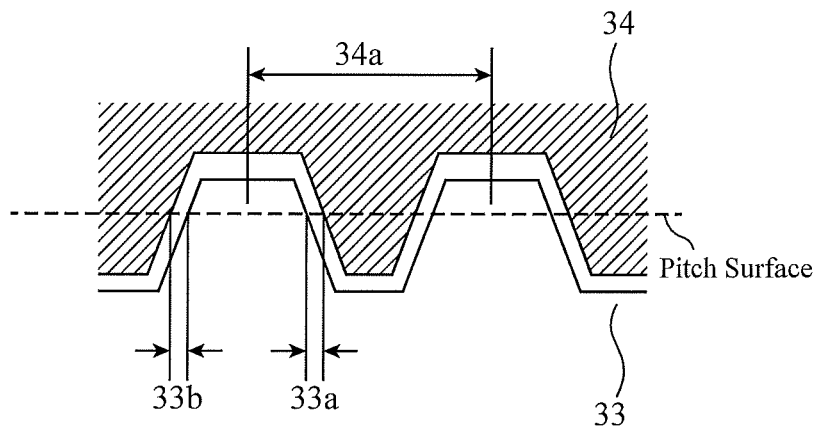
FIG. 31 is a diagram illustrating engagement between teeth of a worm and teeth of a worm wheel.

Subsequently, the pan turning controlling unit 21a sets the number of offset pulses (step ST130). The number of offset pulses is set using, for example, the tooth angle 34a of the worm wheel 34 illustrated in FIG. 31. Assuming that the number of offset pulses is the number of pulses of the turning pulse signal S2 required for turning the camera 10 by 1.5 degrees that is a half of the tooth angle 34a of the worm wheel 34, since the camera 10 turns by 0.05 degrees with one pulse of the turning pulse signal S2, the number of offset pulses is 30. Note that, the number of offset pulses is not limited to one that is set on the basis of the half of the tooth angle 34a of the worm wheel 34, but may be set on the basis of one-third of the tooth angle 34a or 100% of the tooth angle 34a. In short, the backlash between the worm 33 and the worm wheel 34 is set as a lower limit, and the number of offset pulses is set on the basis of a value equal to or greater than the lower limit.

Subsequently, the pan turning controlling unit 21a sets the forward and reverse rotation signal S1 output to the pan driving unit 31 to the L level, and then outputs the turning pulse signal S2 to the pan driving unit 31. As a result, the pan turning controlling unit 21a turns the camera 10 in the reverse rotational direction (step ST131).

Subsequently, the pan turning controlling unit 21a determines whether the turning pulse signal S2 has been output by an amount corresponding to the turning angle calculated in step ST123, here 1800 pulses (step ST132).

When the turning pulse signal S2 has not been output by the amount corresponding to the turning angle (step ST132; NO), the processing returns to step ST131.

On the other hand, when the turning pulse signal S2 has been output by the amount corresponding to the turning angle (step ST132; YES), the processing proceeds to step ST133.

Figure 34:
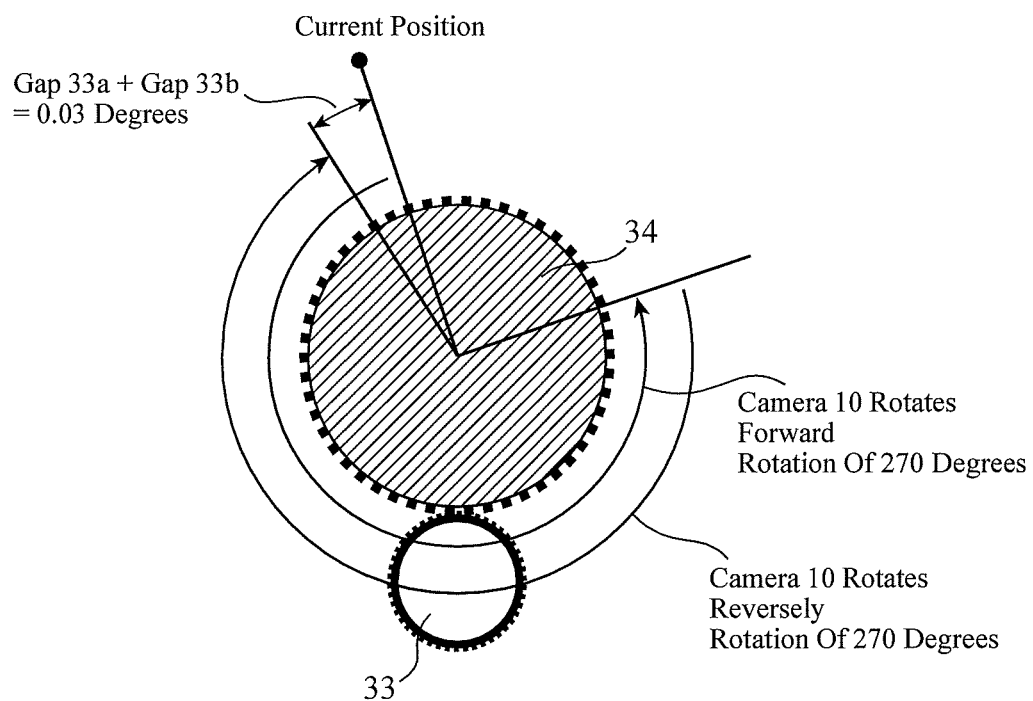
FIG. 34 is a diagram for explaining a phenomenon in which a stop position error occurs.

Here, as already described with reference to FIG. 34, the position of the camera 10 after the turning pulse signal S2 is output by the amount corresponding to the turning angle deviates from the original preset position B by the amount of the backlash between the worm 33 and the worm wheel 34. This position of the camera 10 deviating from the original preset position B is referred to as a target position B1 with respect to the preset position B. The target position B1 is illustrated in FIG. 11.

Subsequently, the pan turning controlling unit 21a adds the turning pulse signal S2 by the number of offset pulses, that is, 30 pulses here, thus turning the camera 10 further in the reverse rotational direction (step ST133). According to FIG. 31, since the half of the tooth angle 34a of the worm wheel 34 is larger than the backlash between the worm 33 and the worm wheel 34, as illustrated in FIG. 11, the camera 10 passes through the preset position B and continues turning in the reverse rotational direction further.

While the pan turning controlling unit 21a outputs the turning pulse signal S2 by the number of offset pulses, the cutout position calculating unit 21b changes the cutout position for the image data stored in the image storing unit 14 (step ST134). Details of step ST134 will be described later.

Subsequently, the pan turning controlling unit 21a determines whether the turning pulse signal S2 has been output by the number of offset pulses, here 30 pulses (step ST135). When the turning pulse signal S2 has not been output by the number of offset pulses (step ST135; NO), the processing returns to step ST133.

On the other hand, when the turning pulse signal S2 has been output by the number of offset pulses (step ST135; YES), the processing proceeds to step ST136.

Here, the position of the camera 10 turned in the reverse rotational direction from the current position acquired in step ST121 due to the given 1800+30 pulses of the turning pulse signal S2 has turned too far in the reverse rotational direction by about the half of the tooth angle 34a of the worm wheel 34 with respect to the preset position B. This position of the camera 10 deviating from the original preset position B is referred to as a target position B2 with respect to the preset position B. The target position B2 is illustrated in FIG. 11.

Subsequently, the pan turning controlling unit 21a turns the camera 10 in the forward rotational direction by the number of offset pulses, here 30 pulses (step ST136).

While the pan turning controlling unit 21a outputs the turning pulse signal S2 by the number of offset pulses, the cutout position calculating unit 21b changes the cutout position for the image data stored in the image storing unit 14 subsequently to step ST134 (step ST137). Details of step ST137 will be described later.

Subsequently, the pan turning controlling unit 21a determines whether the turning pulse signal S2 has been output by the number of offset pulses, here 30 pulses, after turning the camera 10 in the forward rotational direction (step ST138). When the turning pulse signal S2 has not been output by the number of offset pulses (step ST138; NO), the processing returns to step ST136.

On the other hand, when the turning pulse signal S2 has been output by the number of offset pulses (step ST138; YES), the processing proceeds to step ST139.

Figure 32:
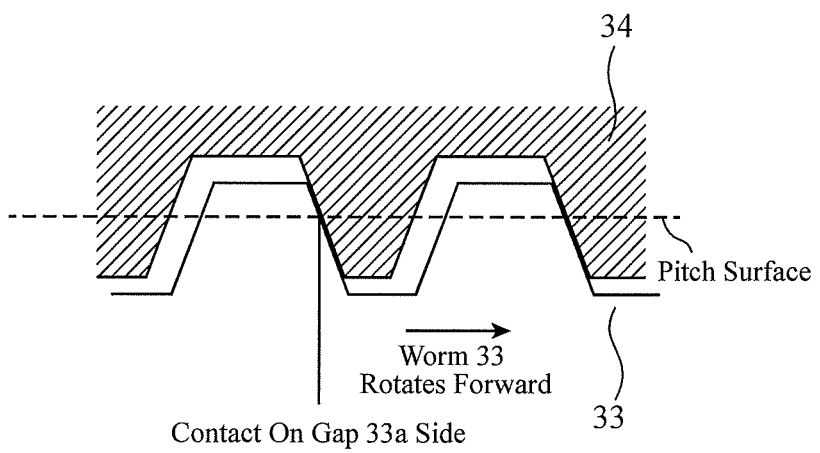
FIG. 32 is a diagram illustrating engagement between the teeth of the worm and the teeth of the worm wheel in forward rotation.
Figure 33:
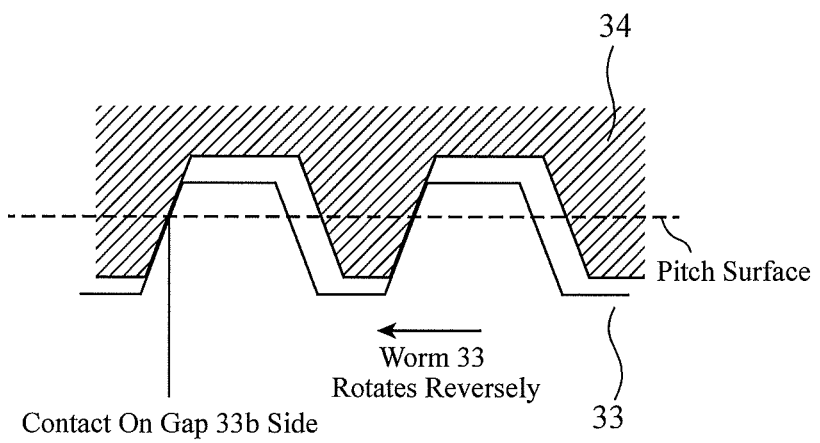
FIG. 33 is a diagram illustrating engagement between the teeth of the worm and the teeth of the worm wheel in reverse rotation.

As described above, once the camera 10 is additionally turned in the reverse rotational direction by the number of offset pulses, and then returned in the forward rotational direction by the same number of offset pulses. As a result, the worm 33 and the worm wheel 34 are brought into an engagement state during forward rotation illustrated in FIG. 32. Therefore, the position of the camera 10 is the accurate preset position B in which the stop position error due to the backlash is eliminated.

Subsequently, the cutout position calculating unit 21b instructs the image cutout unit 15 to return the cutout position for the image data stored in the image storing unit 14 to the position indicated in step ST120 (step ST139). As a result, the image displayed on the monitor 42 by the display controlling unit 41 by using the image data output by the image cutout unit 15 is an accurate image photographed at the preset position B. This instruction in step ST139 is maintained until the cutout position is changed by the cutout position calculating unit 21b, and thus the image cutout unit 15 continues outputting the image data corresponding to an area whose position in the photographing range of the camera 10 is fixed at a set position.

Figure 12:
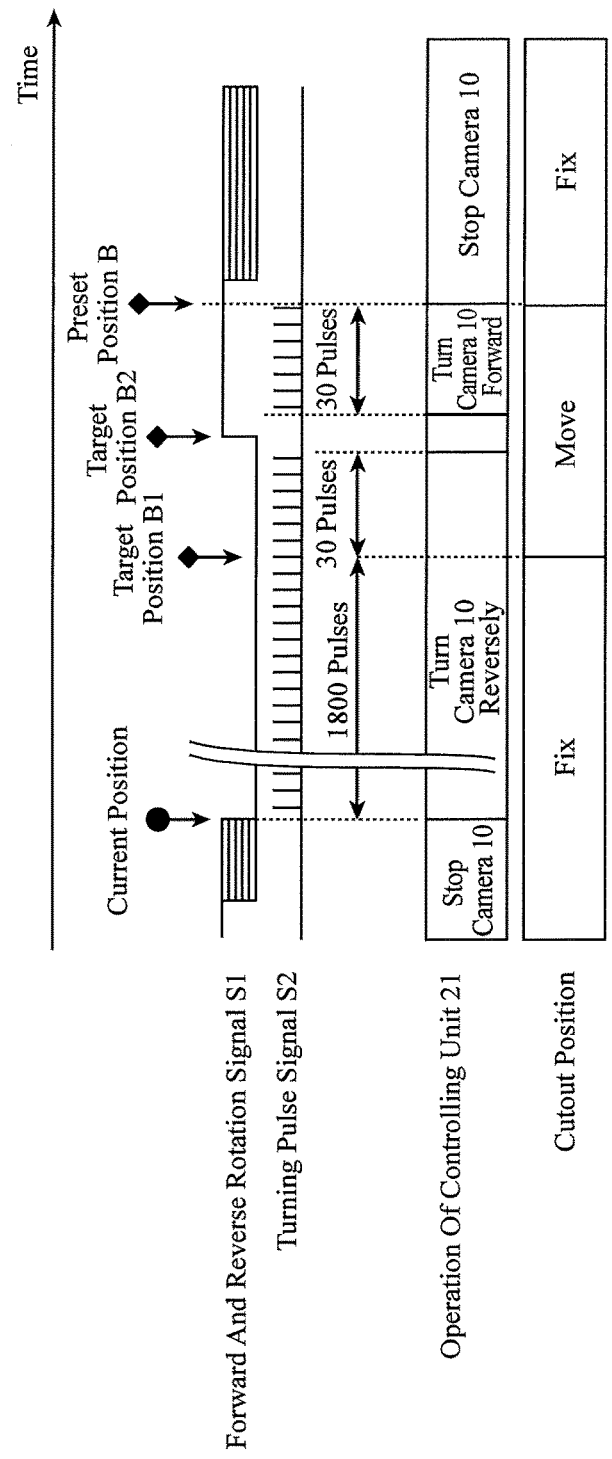
FIG. 12 is a timing chart corresponding to the flowchart of FIG. 10.

FIG. 12 illustrates a timing chart until the camera 10 reaches the preset position B from the current position of 30 degrees in the above-mentioned way.

Figure 17:
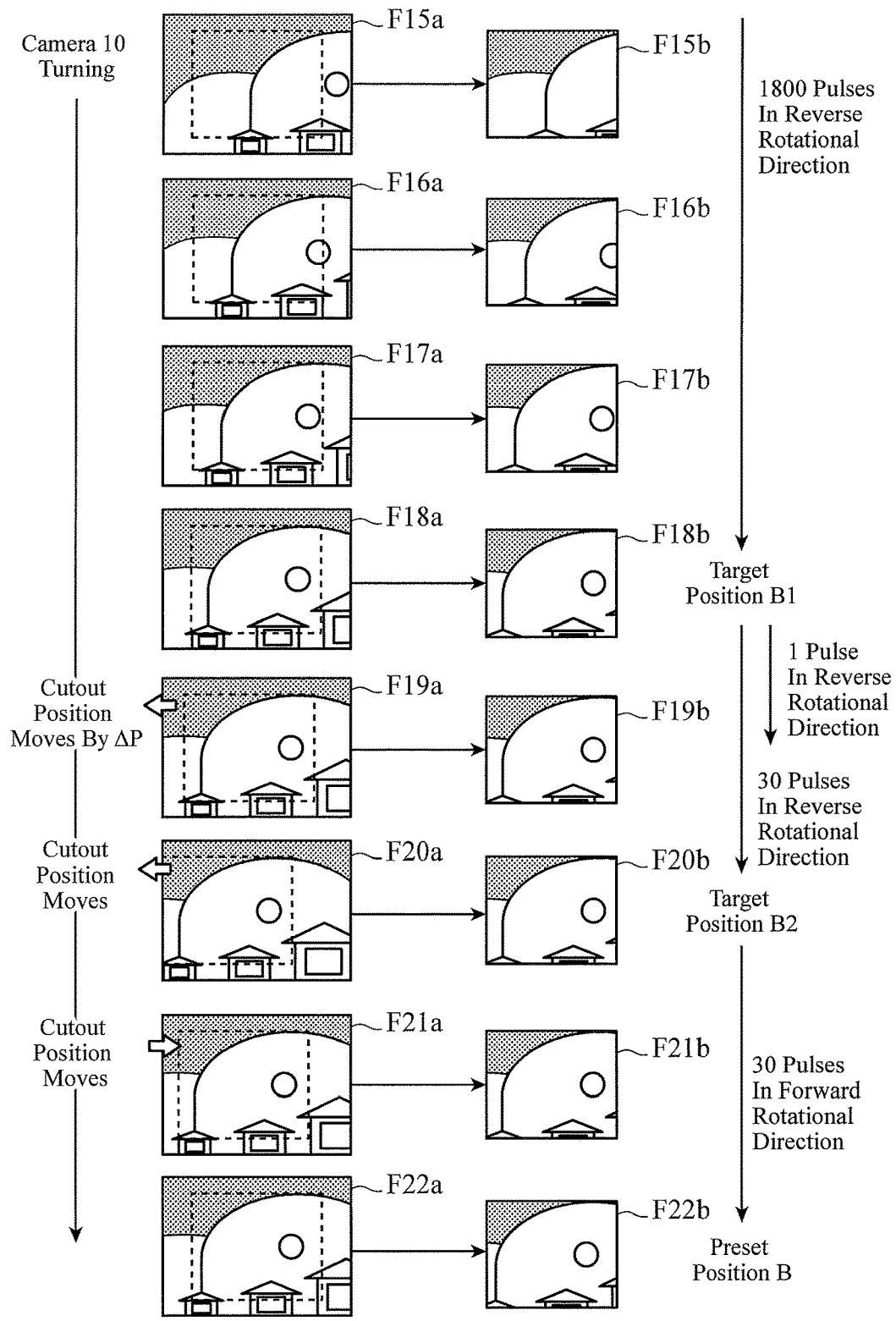
FIG. 17 is a diagram illustrating images corresponding to the flowchart of FIG. 10.

Next, operation in steps ST134 and ST137 will be described with reference to FIG. 17. FIG. 17 illustrates images F15a to F22a indicated by image data stored in the image storing unit 14 and images F15b to F22b indicated by image data output by the image cutout unit 15 during the processing illustrated in FIG. 10.

From when the camera 10 is turned in the reverse rotational direction in step ST131 until the step ST133 is reached, that is, until the position of the camera 10 reaches the target position B1 from the current position acquired in step ST121, the range of the scenery in the images F15a to F18a also moves in accordance with the turning of the camera 10. In addition, in the meantime, the cutout position for the image data stored in the image storing unit 14 is set to the position illustrated in FIGS. 14A to 14C in step ST120, and thus the range of the scenery in the images F15b to F18b also moves. As can be seen from this, until the camera 10 reaches the target position B1, the image cutout unit 15 continues outputting the image data corresponding to the area whose position in the photographing range of the camera 10 is fixed at the set position.

On the other hand, from when the camera 10 is turned in the reverse rotational direction by the offset pulse in step ST133 until step ST139 is reached, that is, from when the position of the camera 10 becomes the target position B1 and further becomes the target position B2 until the position becomes the preset position B later, the cutout position for the image data stored in the image storing unit 14 is changed at all times by the processing in steps ST134 and ST137.

Figure 13:
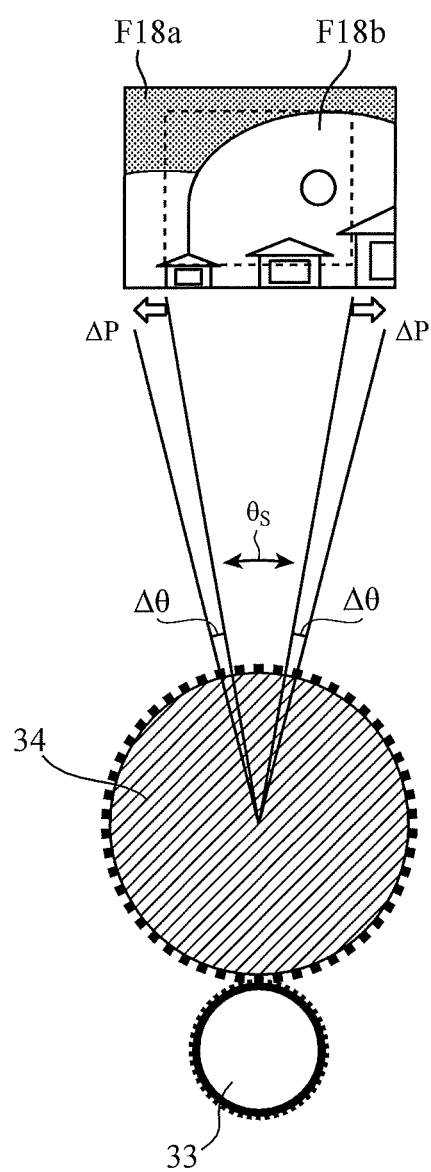
FIG. 13 is a diagram illustrating a relationship between an image and turning of the camera in the first embodiment of the present invention.

The processing in step ST134 will be described in detail also with reference to FIG. 13.

First, for changing the cutout position, the cutout position calculating unit 21b acquires a zoom value Zs of the lens 11 from the zoom controlling unit 21c, and calculates an angle of view θs of the image F18b indicated by the image data output by the image cutout unit 15. For this processing, for example, a storage unit (not illustrated) stores the angle of view θs of when the zoom value Zs of the lens 11 is 1.

Subsequently, by using the angle of view θs calculated, a turning angle Δθ of the camera 10 per pulse of the turning pulse signal S2, and a resolution R of the image F18b indicated by the image data output by the image cutout unit 15, the cutout position calculating unit 21b calculates the number ΔP of shifted pixels in the image F18b when the camera 10 turns Δθ as indicated in expression (1) below. The resolution R is the total number of pixels in the horizontal direction of the image F18b $$\Delta P = \Delta \theta / \theta s \times R \quad (1)$$

Note that, the expression (1) is true even when the angle of view θs is replaced by an angle of view of an image indicated by image data output by the image pickup unit 13 and the resolution R is replaced by the total number of pixels in the horizontal direction of the image indicated by the image data output by the image pickup unit 13. The number ΔP of shifted pixels in the image F18b is synonymous with the number of shifted pixels in the image F18a when the camera 10 turns Δθ that is, is synonymous with the amount of movement of the photographing range of the camera 10.

Then, whenever the pan turning controlling unit 21a outputs one offset pulse to further turn the camera 10 in the reverse rotational direction after the position of the camera 10 becomes the target position B1, the cutout position calculating unit 21b indicates, to the image cutout unit 15, a cutout position which causes the image indicated by the image data output by the image cutout unit 15 to move by the number ΔP of shifted pixels in the direction in which the range of the scenery in the images F18a to F20a moves, that is, in the direction opposite to the turning direction of the camera 10.

When the position of the camera 10 becomes the target position B1 and then turns in the reverse rotational direction by the offset pulse, as for the images F19a and F20a indicated by the image data stored in the image storing unit 14, the position of the camera 10 is moved in the right direction in the figure as compared with that corresponding to the image F18a indicated by the image data stored in the image storing unit 14 at the target position B1. However, at that time, by the instruction of the cutout position calculating unit 21b, the images F19b and F20b indicated by the image data output by the image cutout unit 15 move in the left direction in the figure by the number ΔP of shifted pixels, whereby the images F19b and F20b are the same as the image F18b photographed at the target position B1.

While the camera 10 turns in the reverse rotational direction by the offset pulse, the cutout position calculating unit 21b performs instruction for such movement of the cutout position. As a result, the image data corresponding to a partial area of the photographing range of the camera 10 output by the image cutout unit 15 during the turning is the image data corresponding to the area whose position in the photographing range is moved in a direction of canceling the movement of the area linked with the turning of the camera 10 by using the amount of movement of the photographing range.

Therefore, although the camera 10 turns in the reverse rotational direction, the image displayed on the monitor 42 by the display controlling unit 41 using the image data output by the image cutout unit 15 is an image as if the camera 10 stopped at the target position B1.

The processing in step ST137 differs in that the movement of the cutout position is in the opposite direction to that in the case of step ST134 described above, since the camera 10 turns by the number of offset pulses in the forward rotational direction. As a result, the image data corresponding to the partial area of the photographing range of the camera 10 output by the image cutout unit 15 while the camera 10 turns in the forward rotational direction by the offset pulse is the image data corresponding to the area whose position in the photographing range is moved in a direction of canceling the movement of the area linked with the turning of the camera 10 by using the amount of movement of the photographing range.

Therefore, although the camera 10 turns in the forward rotational direction, the image displayed on the monitor 42 by the display controlling unit 41 using the image data output by the image cutout unit 15 is an image as if the camera 10 stopped at the target position B1

As described above, when the camera 10 is turned in the reverse rotational direction to reach the preset position B, the camera 10 having reached the target position B1 is further turned in the reverse rotational direction by the number of offset pulses, and then the camera 10 is further turned in the forward rotational direction by the number of offset pulses, whereby the stop position error due to the backlash can be eliminated. At that time, while the position of the camera 10 is adjusted from the target position B1 to the target position B2 and then from the target position B2 to the preset position B, the image displayed on the monitor 42 is an image as if the camera 10 stopped at the target position B1. Therefore, shaking is reduced of the image displayed on the monitor 42 while the camera 10 turns from the target position B1 to the preset position B, and thus a satisfactory image is provided to the user.

Note that, in the above, the description has been made for elimination of the stop position error in the preset operation and reduction of image shaking at that time. However, the image pickup device 1 according to the first embodiment can be used not only in the operation for turning the camera 10 to the pre-registered preset position but also in the operation for turning the camera 10 to a freely-selected objective position. In the above description, the target position B1 has been described as a specific example of the first position, and the preset position B has been described as a specific example of the second position.

Further, in the above description, the case of pan operation has been described. However, also in the case of tilt operation, by doing as described above, it is possible to eliminate the stop position error and reduce the image shaking at that time.

In addition, in the above description, the image cutout unit 15 outputs a part of the image data stored in the image storing unit 14. However, by changing the horizontal and vertical read timing of the image pickup unit 13 by the controlling unit 21, the image pickup unit 13 may output only a part of the image data generated by the image pickup unit 13. In this case, the image pickup unit 13 outputting the image data corresponding to a partial area of the photographing range of the camera 10 functions as the image cutout unit 15.

Alternatively, by providing a mechanical movable unit for moving in the horizontal and vertical directions to cover a part of the lens 11, the image pickup unit 13 may output image data corresponding to a partial area of the original photographing range of the camera 10. In this case, the image pickup unit 13 functions as the image cutout unit 15.

In addition, by providing an internet protocol (IP) camera as the camera 10, encoded data such as MPEG, H.264, or the like may be output from the image outputting unit 16.

In addition, in the above, the combination of the worm 33 and the worm wheel 34 has been described as the rotational force transmission mechanism. However, the rotational force may be transmitted from the worm 33 to the worm wheel 34 via a belt. In addition, a plurality of the belts, the worms 33, and the worm wheels 34 may be combined to form a rotational force transmission mechanism. In short, it is sufficient that the camera 10 turns by the rotational force transmitted by the tooth engagement in the rotational force transmission mechanism.

As described above, with the image pickup device 1 according to the first embodiment, even when the camera 10 is turned in the reverse rotational direction to reach the preset position B, the stop position error due to the backlash can be eliminated. At that time, the shaking is reduced of the image displayed on the monitor 42 while the camera 10 is turned in the reverse rotational direction and the forward rotational direction by the offset pulse, and thus a satisfactory image is provided to the user.

Second Embodiment

Figure 18:
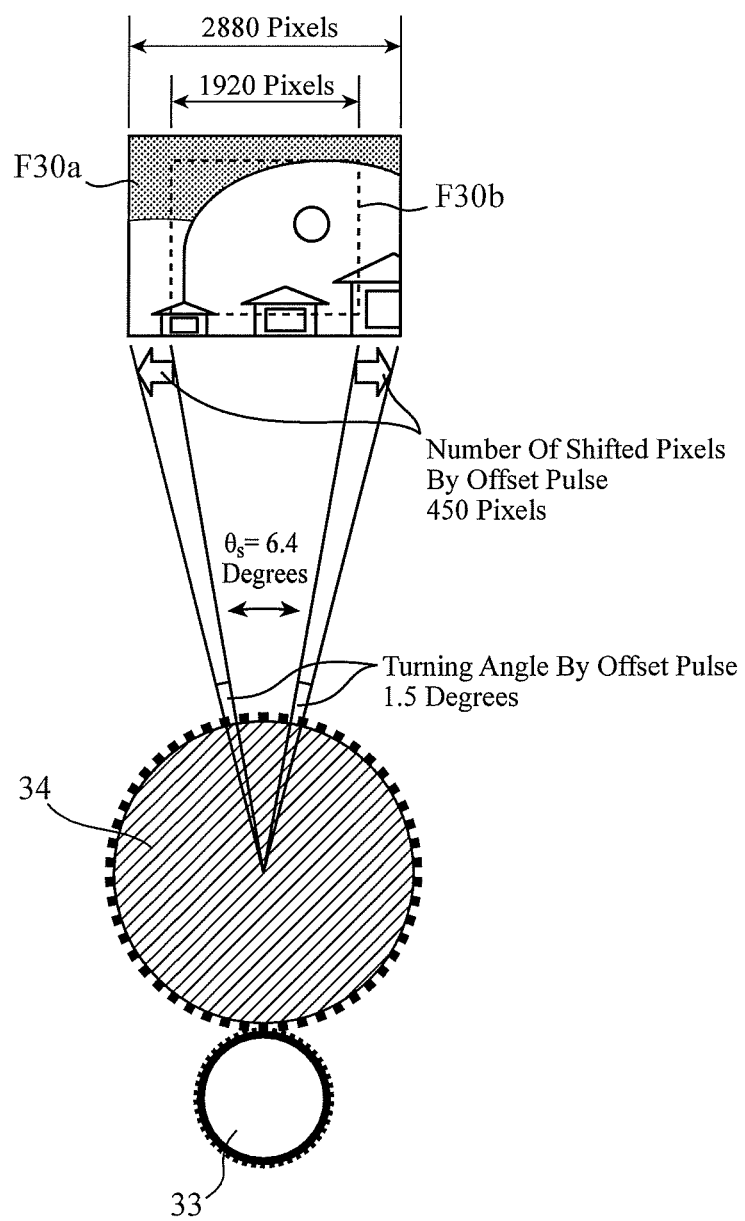
FIG. 18 is a diagram illustrating a relationship between an image and turning of the camera.

FIG. 18 is a diagram illustrating a relationship between an image F30a indicated by image data stored in the image storing unit 14 and an image F30b indicated by image data output by the image cutout unit 15, when a zoom value of the lens 11 is set to 10 times, for example. Here, the angle of view θs of the image F30b is 6.4 degrees when the zoom value of the lens 11 is 10 times, the total number of pixels in the horizontal direction of the image F30b is 1920 pixels equivalent to 2K, and the turning angle Δθ of the camera 10 per pulse of the turning pulse signal S2 is 0.05 degrees. Then, the number ΔP of shifted pixels is 15 pixels, by the expression (1). Therefore, when the number of offset pulses is 30, the total number of shifted pixels is 15 pixels x 30, that is, 450 pixels. In addition, the camera 10 turns by 1.5 degrees in total by the turning pulse signal S2 of 30 pulses in total.

Figure 10:
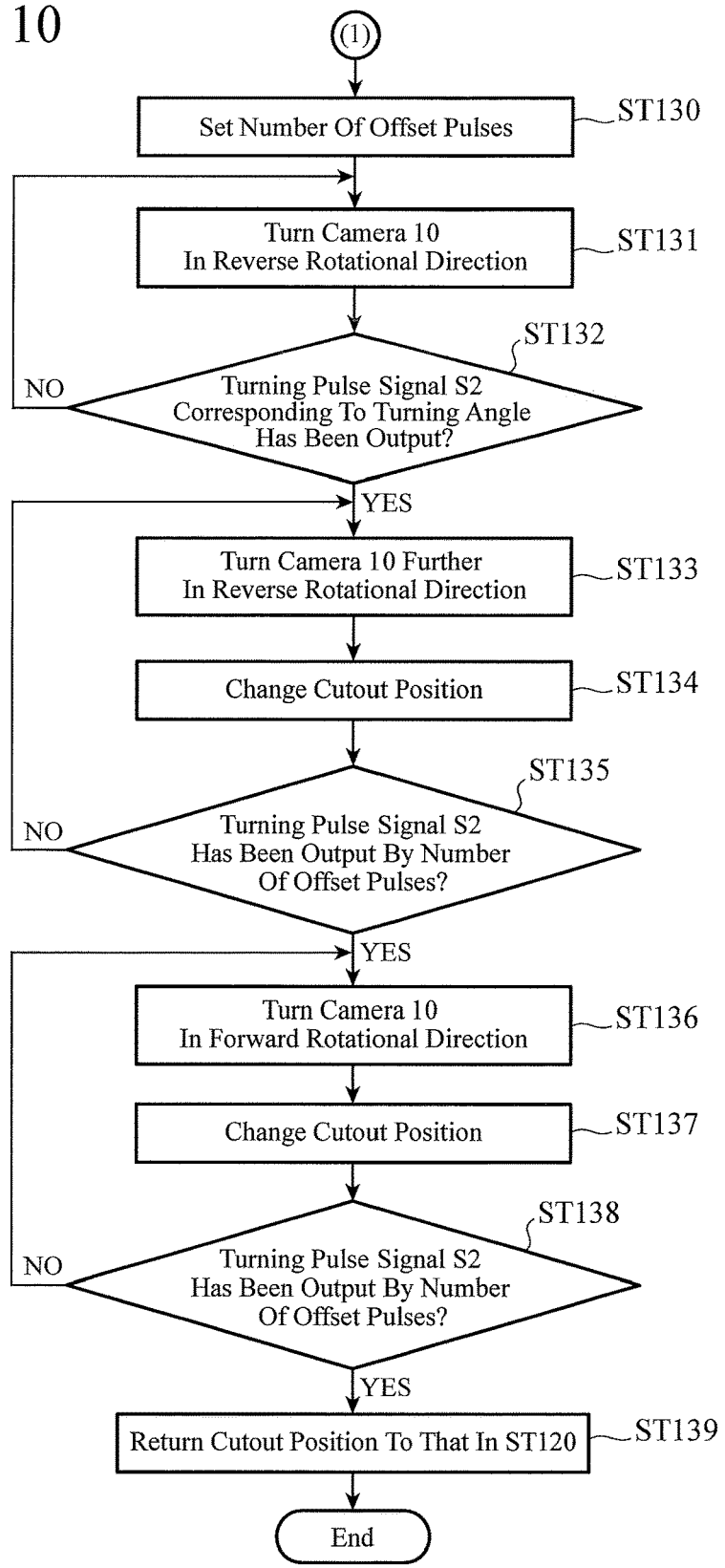
FIG. 10 is a flowchart illustrating processing performed by the image pickup device according to the first embodiment of the present invention.
Figure 11:
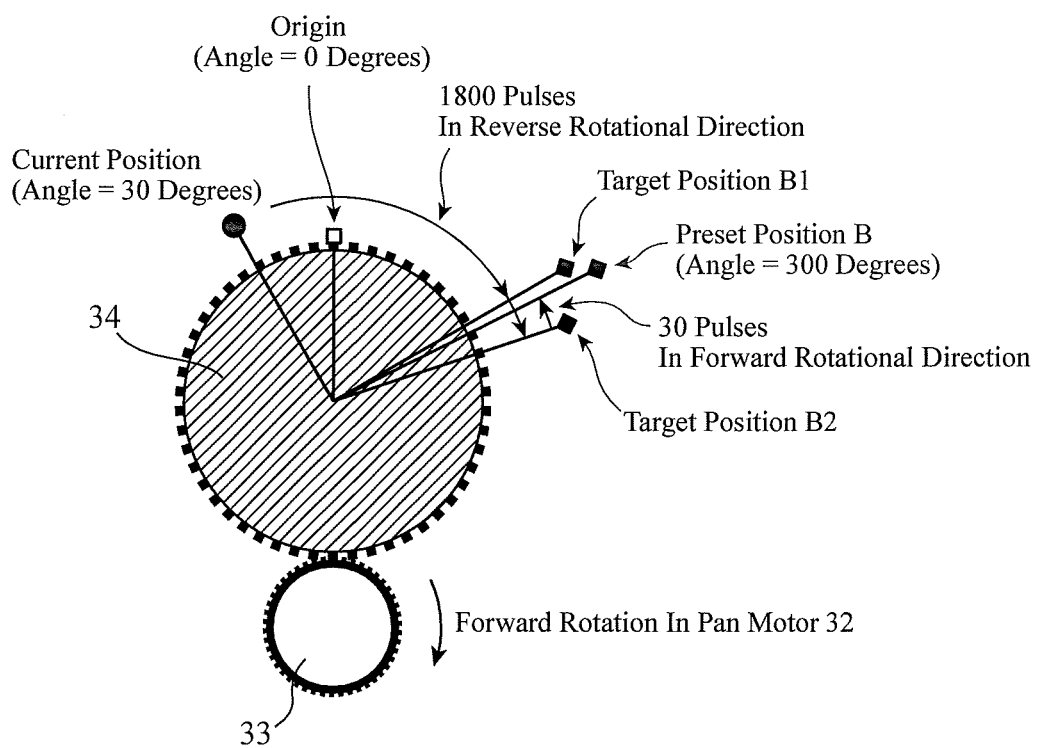
FIG. 11 is a diagram illustrating turning operation of the camera corresponding to the flowchart of FIG. 10.

In such a case, if the total number of pixels in the horizontal direction of the image F30a, that is, the total number of pixels of the image pickup unit 13 is 2880 pixels equivalent to 3K, the image data output by the image cutout unit 15 during steps ST134 and ST137 of FIG. 10 is image data corresponding to the area whose position in the photographing range of the camera 10 is moved, and the area moved at that time does not deviate from the photographing range. This is because the total number of pixels in the horizontal direction of the image F30b is 1920 pixels, the movement by the offset pulse is 450 pixels×2 in total of the reverse rotation and the forward rotation, and the total of these, 2820 pixels, is smaller than 2880 pixels.

Figure 19:
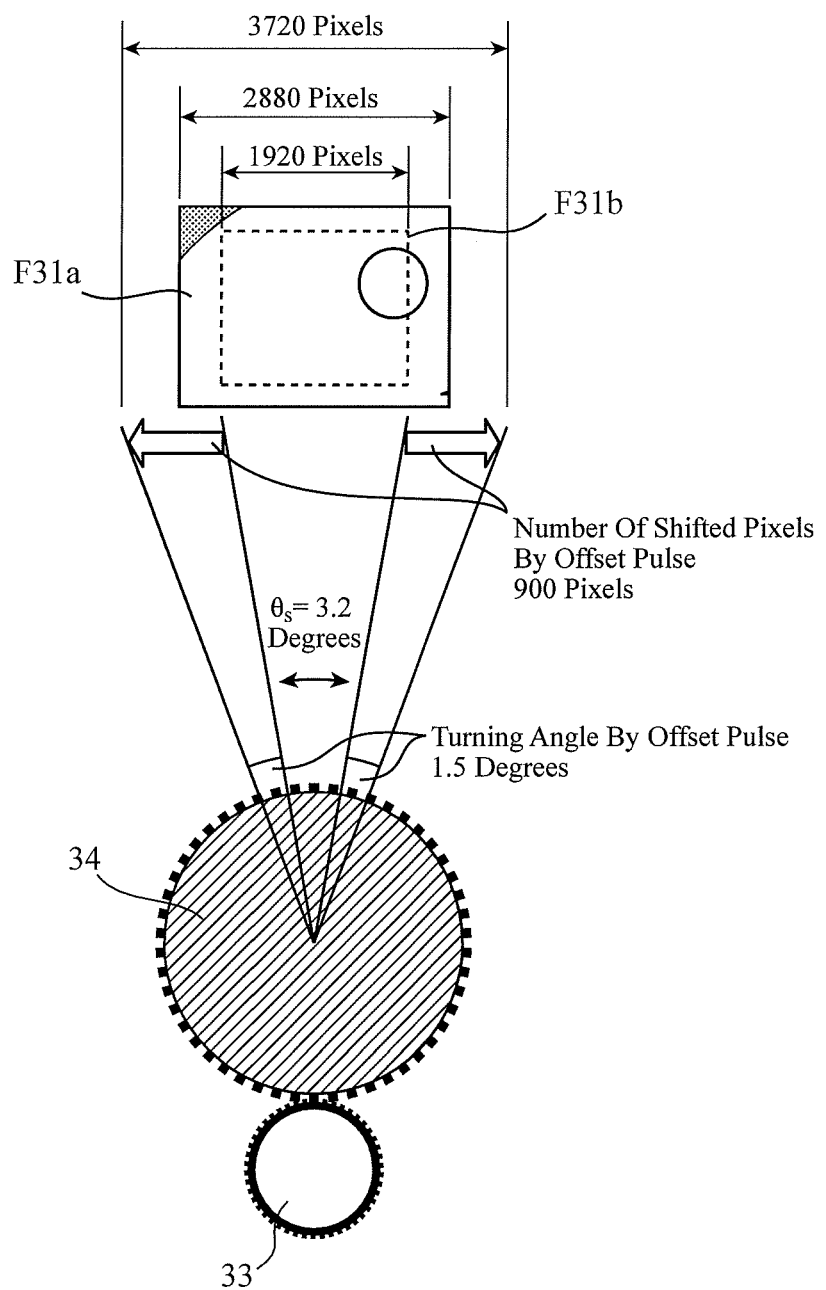
FIG. 19 is a diagram illustrating a relationship between an image and turning of the camera.

On the other hand, FIG. 19 is a diagram illustrating a relationship between an image F31a indicated by image data stored in the image storing unit 14 and an image F31b indicated by image data output by the image cutout unit 15, when the zoom value of the lens 11 is set to 20 times, for example. When the zoom value of the lens 11 is 20 times, the angle of view θs of the image F31b is 3.2 degrees, so that when the number of offset pulses is 30, the total number of shifted pixels is 30 pixels×30, that is, 900 pixels, by the expression (1) and the like.

In such a case, when the processing is performed as in steps ST134 and ST137 of FIG. 10, the image data output by the image cutout unit 15 is image data corresponding to the area whose position in the photographing range of the camera 10 is moved, and the area moved at that time deviates from the photographing range. Specifically, the image indicated by the image data output by the image cutout unit 15 during steps ST134 and ST137 corresponds to an image obtained while an image having a total number of pixels in the horizontal direction of 1920 pixels is moved 900 pixels in the right direction and the left direction on an image having a total number of pixels in the horizontal direction of 2880 pixels, so that the range of the movement is a total of 1920 pixels+900 pixels×2, that is, 3720 pixels, and is thus greater than 2880 pixels as illustrated in FIG. 19. To avoid such a situation, it is necessary that the total number of pixels in the horizontal direction of the image F31a is greater than 3720 pixels, for example, 3840 pixels equivalent to 4K.

As illustrated in FIG. 19, when the image cutout unit 15 outputs the image data corresponding to the area whose position in the photographing range of the camera 10 is moved, in a case where the area deviates from the photographing range when the area is moved, applying a method of reducing the number of offset pulses is considered first. However, in a second embodiment, another method will be described.

Figure 20:
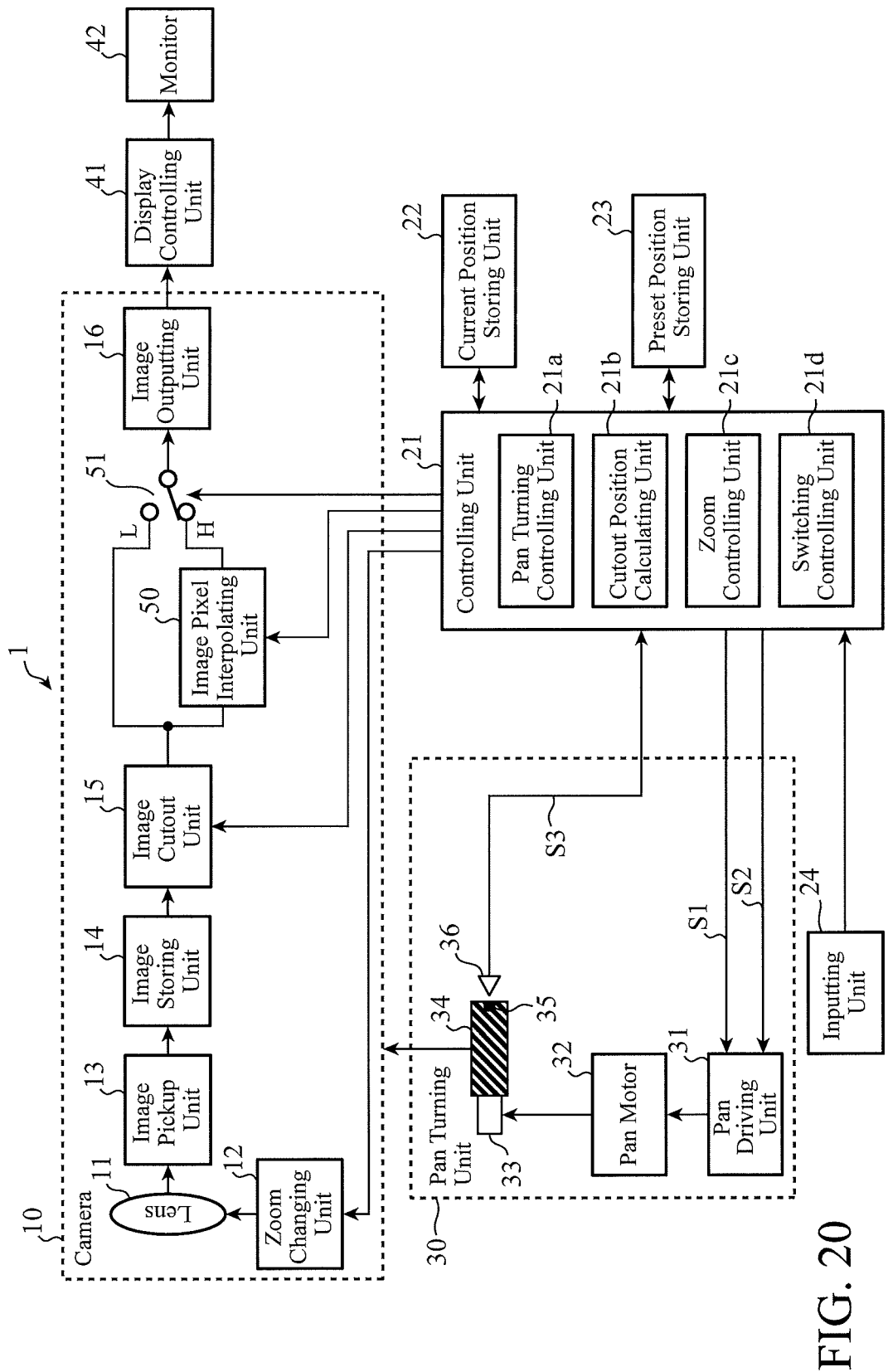
FIG. 20 is a configuration diagram of an image pickup device according to a second embodiment of the present invention.

FIG. 20 is a configuration diagram of an image pickup device 1 according to the second embodiment of the present invention. Components that are the same as or equivalent to those described in the first embodiment are denoted by the same reference numerals, and the description thereof is omitted or simplified.

The image pickup device 1 according to the second embodiment includes an image pixel interpolating unit 50 and a first image switching unit 51 between the image cutout unit 15 and the image outputting unit 16. In addition, the controlling unit 21 includes a switching controlling unit 21d.

The image pixel interpolating unit 50 performs pixel interpolation processing on the image data output from the image cutout unit 15, and outputs the image data after processing to the first image switching unit 51.

The first image switching unit 51 is a changeover switch for selectively outputting the image data output by the image cutout unit 15 and the image data output by the image pixel interpolating unit 50 to the image outputting unit 16. The image outputting unit 16 outputs the image data selectively output by the first image switching unit 51 to the display controlling unit 41. The display controlling unit 41 displays an image indicated by the image data output by the image outputting unit 16 on the monitor 42.

The switching controlling unit 21d controls switching operation of the first image switching unit 51.

The image pixel interpolating unit 50 and the switching controlling unit 21d may be implemented by the processing circuit 100 that is dedicated hardware as illustrated in FIG. 2A, or may be implemented by the CPU 102 that executes a program stored in the memory 101 as illustrated in FIG. 2B.

Figure 21:
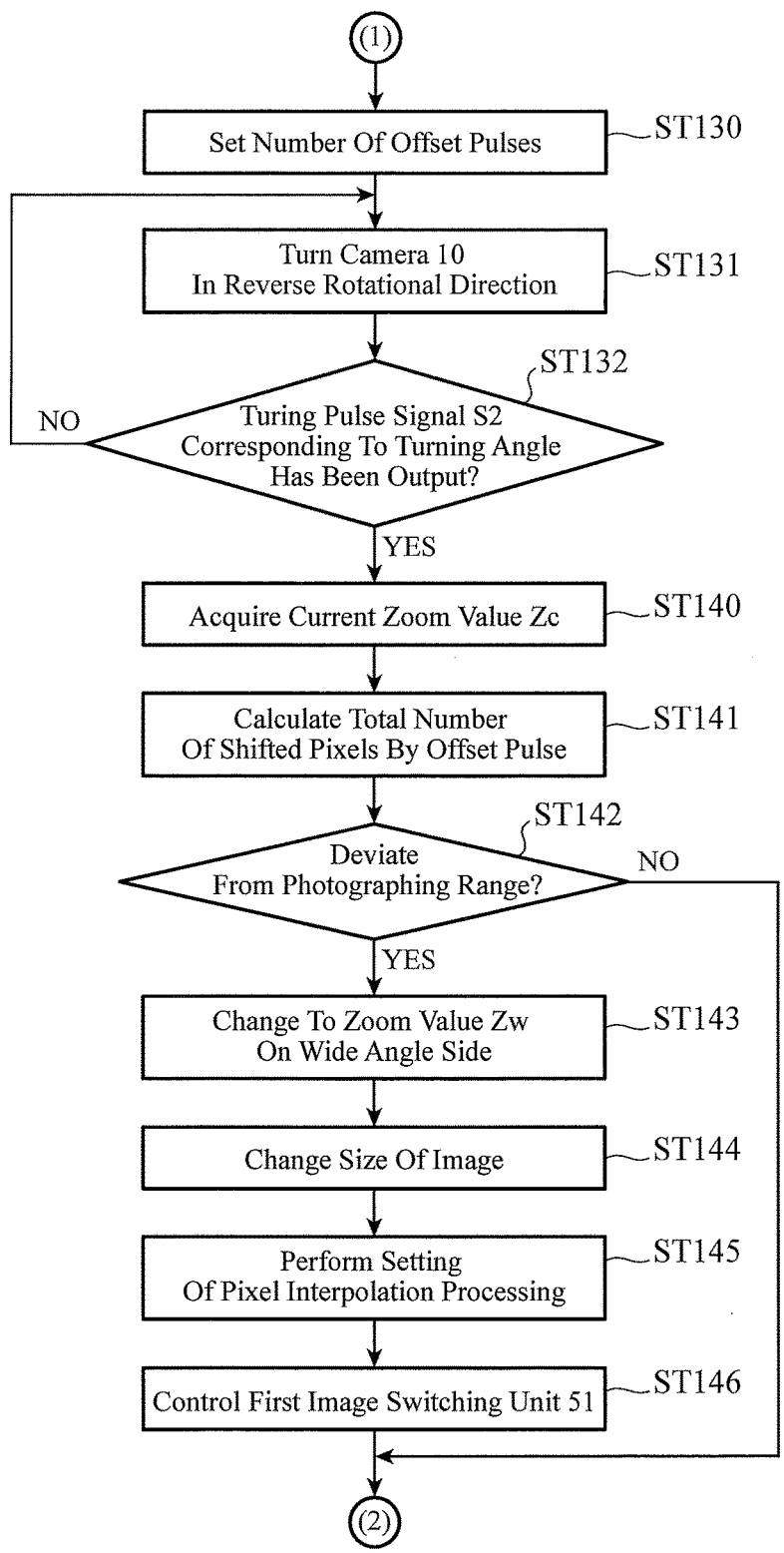
FIG. 21 is a flowchart illustrating processing performed by the image pickup device according to the second embodiment of the present invention.

When the image pixel interpolating unit 50 is implemented by the CPU 102 that executes the program stored in the memory 101, the image pixel interpolating unit 50 includes the memory 101 for storing programs and the likes that cause step ST145 illustrated in the flowchart of FIG. 21 described later to be executed resultantly. In addition, it can also be said that these programs cause a computer to execute a procedure or a method of the image pixel interpolating unit 50.

When the switching controlling unit 21d is implemented by the CPU 102 that executes the program stored in the memory 101, the switching controlling unit 21d includes the memory 101 for storing programs and the likes that cause step ST146 illustrated in the flowchart of FIG. 21 described later to be executed resultantly. In addition, it can also be said that these programs cause a computer to execute a procedure or a method of the switching controlling unit 21d.

In the second embodiment, a display control device is configured by the image cutout unit 15, the cutout position calculating unit 21b, the display controlling unit 41, the zoom controlling unit 21c, and the image pixel interpolating unit 50. In addition, instead of the configuration illustrated in FIG. 20, a single display control device may be configured by the image cutout unit 15, the cutout position calculating unit 21$b$, the display controlling unit 41, the zoom controlling unit 21$c$, and the image pixel interpolating unit 50, and communicably connected to the monitor 42 and also to the camera 10 and the controlling unit 21 both of which are configured by excluding the components of the single display control device.

Figure 22:
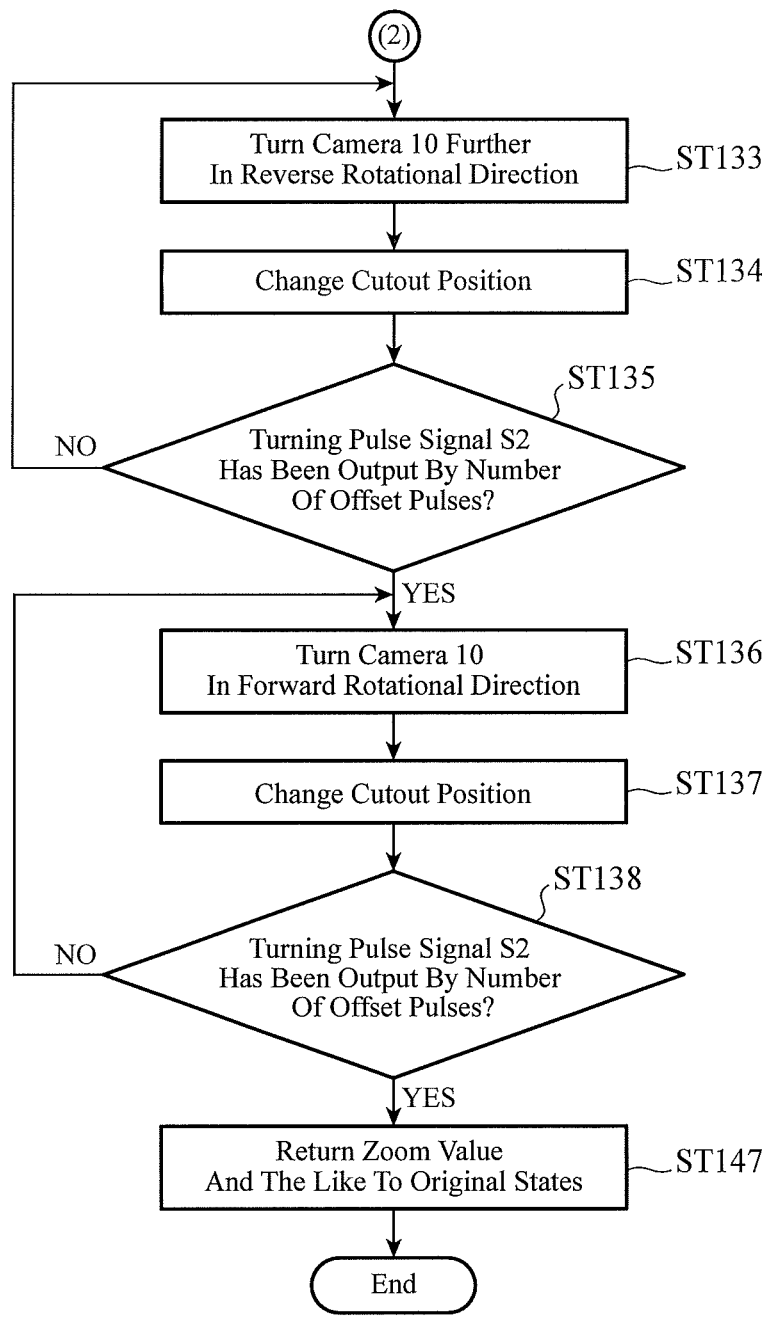
FIG. 22 is a flowchart illustrating processing performed by the image pickup device according to the second embodiment of the present invention.

Next, with reference to flowcharts illustrated in FIGS. 21 and 22 and a timing chart illustrated in FIG. 23, an example will be described of preset operation of the image pickup device 1 according to the second embodiment configured as described above.

Figure 8:
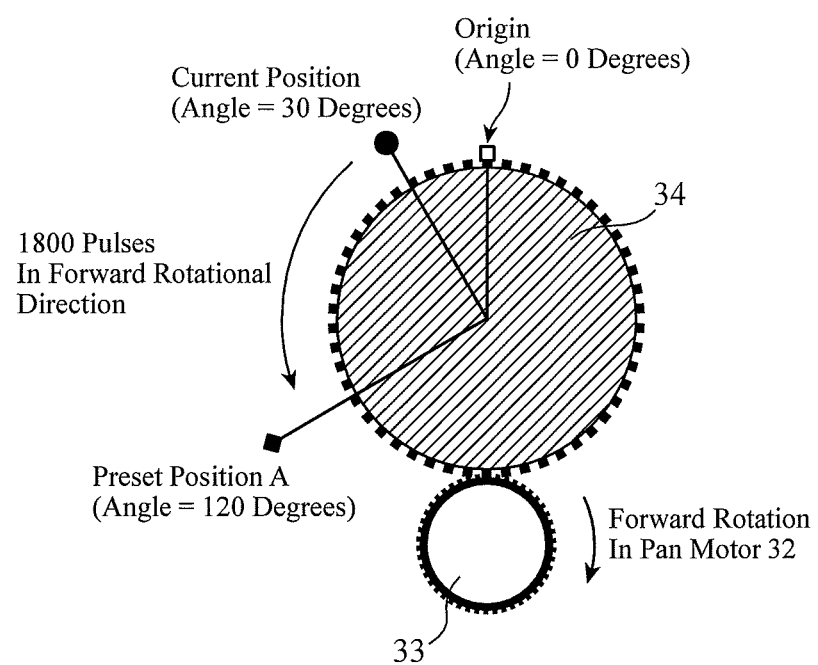
FIG. 8 is a diagram illustrating turning operation of a camera corresponding to the flowchart of FIG. 7.
Figure 9:
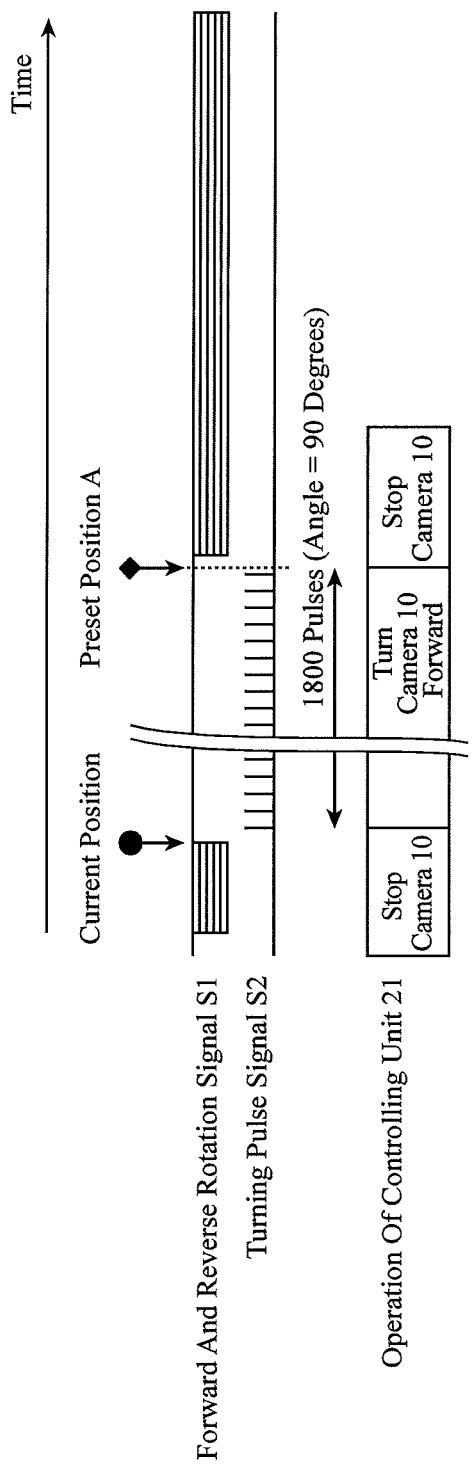
FIG. 9 is a timing chart corresponding to the flowchart of FIG. 7.

The preset operation in the case of turning the camera 10 in the forward rotational direction to the preset position A as illustrated in FIG. 8 is as already described in steps ST120 to ST128 of FIG. 7, so that the description thereof is omitted. In the following description, preset operation will be described in the case of turning the camera 10 in the reverse rotational direction to the preset position B as illustrated in FIG. 11.

When it is determined that the turning direction of the camera 10 is the reverse rotational direction by the processing in steps ST120 to ST124 already described with reference to FIG. 7 (step ST124; NO), the processing in step ST130 illustrated in FIG. 21 is subsequently performed. Since the processing in steps ST130 to ST132 is as already described with reference to FIG. 10, the description thereof is omitted.

When the turning pulse signal S2 has been output by an amount corresponding to the turning angle (step ST132; YES), the cutout position calculating unit 21$b$ acquires a current zoom value Zc of the lens 11 from the zoom controlling unit 21$c$ (step ST140). Here, the description will be made below assuming that the zoom value Zc is, for example, 20 times.

Subsequently, the cutout position calculating unit 21$b$ calculates the number ΔP of shifted pixels when the camera 10 turns Δθ as indicated in the expression (1). Further, the cutout position calculating unit 21$b$ calculates the total number of shifted pixels when the turning pulse signal S2 is output by the number of offset pulses (step ST141). Here, as described above with reference to FIG. 19, the description will be made assuming that the total number of shifted pixels is 900 pixels.

Subsequently, the cutout position calculating unit 21$b$ compares the total number of pixels in the horizontal direction of the image indicated by the image data stored in the image storing unit 14 with the number of pixels obtained by adding the total number of shifted pixels obtained by summing that of the forward rotation and that of the reverse rotation to the total number of pixels in the horizontal direction of the image indicated by the image data output by the image cutout unit 15. As a result, it is determined whether when the image cutout unit 15 outputs the image data corresponding to the area whose position in the photographing range of the camera 10 is moved during steps ST134 and ST137, the moved area deviates from the photographing range (step ST142) Here, the total number of pixels in the horizontal direction of the image indicated by the image data stored in the image storing unit 14 is 2880 pixels. In addition, the total number of pixels in the horizontal direction of the image indicated by the image data output by the image cutout unit 15 is 1920 pixels. In addition, the total number of shifted pixels obtained by summing that of the forward rotation and that of the reverse rotation is 900 pixels×2, that is, 1800 pixels.

When the area does not deviate from the photographing range of the camera 10 (step ST142; NO), the processing proceeds to step ST133 of FIG. 22. This corresponds to a case where the total number of pixels in the horizontal direction of the image indicated by the image data stored in the image storing unit 14 is equal to or greater than the number of pixels obtained by adding the total number of shifted pixels obtained by summing that of the forward rotation and that of the reverse rotation to the total number of pixels in the horizontal direction of the image indicated by the image data output by the image cutout unit 15. The processing in step ST133 and subsequent steps is as already described with reference to FIG. 10.

On the other hand, when the area deviates from the photographing range of the camera 10 (step ST142; YES), the zoom controlling unit 21$c$ outputs a signal to the zoom changing unit 12 so that the zoom value of the lens 11 is changed to a zoom value Zw that is on the wide angle side when compared with the current zoom value Zc (step ST143). This corresponds to a case where the total number of pixels in the horizontal direction of the image indicated by the image data stored in the image storing unit 14 is less than the number of pixels obtained by adding the total number of shifted pixels obtained by summing that of the forward rotation and that of the reverse rotation to the total number of pixels in the horizontal direction of the image indicated by the image data output by the image cutout unit 15. Here, the description will be made below assuming that the zoom value Zw is, for example, 10 times.

Subsequently, to adjust the apparent angle of view on the monitor 42, the cutout position calculating unit 21$b$ changes a cutout range indicated to the image cutout unit 15, in other words, the size of the image indicated by the image data output by the image cutout unit 15, in accordance with the change from the zoom value Zc to the zoom value Zw (step ST144). Since the zoom value is always changed to the wide angle side in step ST143, the size of the image is changed to be smaller. That is, by this step ST144, the image cutout unit 15 outputs the image data corresponding to the area whose size in the photographing range of the camera 10 is reduced.

Here, since the zoom value of the lens 11 is changed from 20 times to 10 times on the wide angle side, the total number of pixels in the horizontal direction of the image indicated by the image data output by the image cutout unit 15 is changed from 1920 pixels to 960 pixels. At that time, it is sufficient that the total number of pixels in the vertical direction of the image is changed so that the aspect ratio is maintained. As a result, for example, as illustrated in FIGS. 14A to 14C, cutting out is performed so that the center of the image indicated by the image data stored in the image storing unit 14 coincides with the center of the image indicated by the image data output by the image cutout unit 15, and this does not differ between before and after changing the image size, but the extent differs of the range to be cut out viewed from the center.

Subsequently, the image pixel interpolating unit 50 acquires the zoom value Zc and the zoom value Zw from the zoom controlling unit 21$c$, and performs setting of pixel interpolation processing using these values (step ST145). In this example, the zoom value changes from 20 times to 10 times, whereby the total number of pixels in the horizontal direction of the image indicated by the image data output by the image cutout unit 15 is changed from 1920 pixels to 960 pixels. Therefore, the setting is made to be able to perform pixel interpolation processing in which the total number of pixels in the horizontal direction becomes 1920 pixels before the change from 960 pixels after the change. The same applies to pixels in the vertical direction.

Thereafter, the image pixel interpolating unit 50 performs pixel interpolation processing on the image data output by the image cutout unit 15 in accordance with the setting in step ST145.

Examples of the method of pixel interpolation include known methods such as a bicubic method, a bilinear method, and a neighborhood method.

Figure 24:
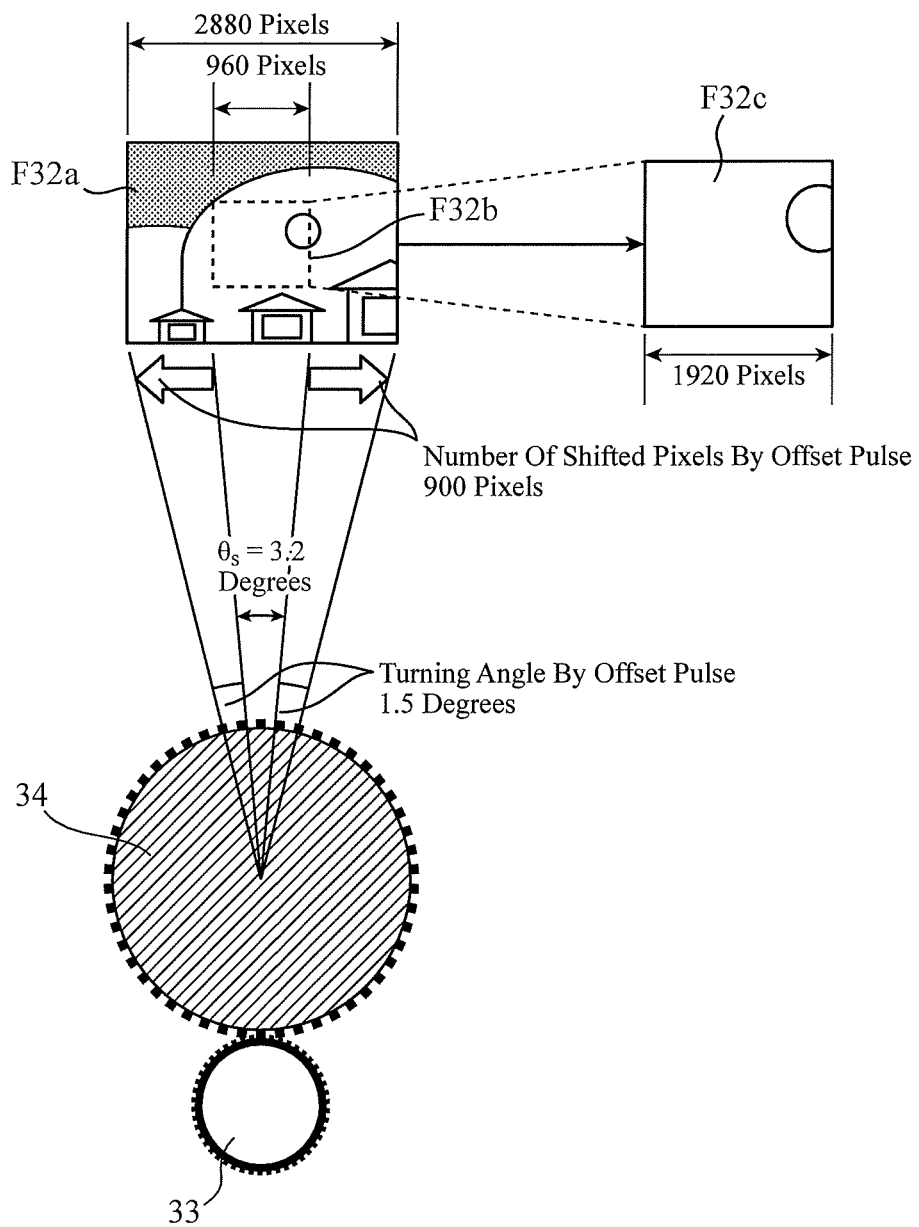
FIG. 24 is a diagram illustrating a relationship between an image and turning of the camera corresponding to the flowcharts of FIGS. 21 and 22.

FIG. 24 is a diagram illustrating a relationship between an image F32a indicated by image data stored in the image storing unit 14, an image F32b indicated by image data output by the image cutout unit 15, and an image F32c indicated by image data subjected to the pixel interpolation processing performed by the image pixel interpolating unit 50, when each setting described in steps ST143 to ST145 is performed.

Subsequently, the switching controlling unit 21d controls the first image switching unit 51 to output the image data output by the image pixel interpolating unit 50 to the image outputting unit 16 (step ST146). The switching controlling unit 21d outputs a control signal to the first image switching unit 51 to control the switching operation thereof. For example, the control signal is set to the H level, whereby the first image switching unit 51 is caused to output the image data output by the image pixel interpolating unit 50.

Subsequently, the processing proceeds to step ST133 of FIG. 22. Then, after the processing in steps ST133 to ST138, in a case where the zoom value, the size of the image indicated by the image data output by the image cutout unit 15, the setting of the pixel interpolation processing, the switching operation of the first image switching unit 51, and the like have been changed in ST143 to ST146, those are returned to the original states (step ST147).

Since the processing in steps ST133 to ST138 is as already described in the first embodiment, the description thereof is omitted. Note that, in consideration of the pixel interpolation processing in the image pixel interpolating unit 50, the number ΔP of shifted pixels calculated by the cutout position calculating unit 21b in step ST134 is as indicated in expression (2) below.

$$\Delta P = \Delta\theta/\theta s \times C \times R \quad (2)$$

A pixel conversion ratio C is a ratio between the total number of pixels in the horizontal direction before the processing performed by the image pixel interpolating unit 50 and that after the processing performed by the image pixel interpolating unit 50. In addition, R is the total number of pixels in the horizontal direction of the image before the size change in step ST144.

Figure 23:
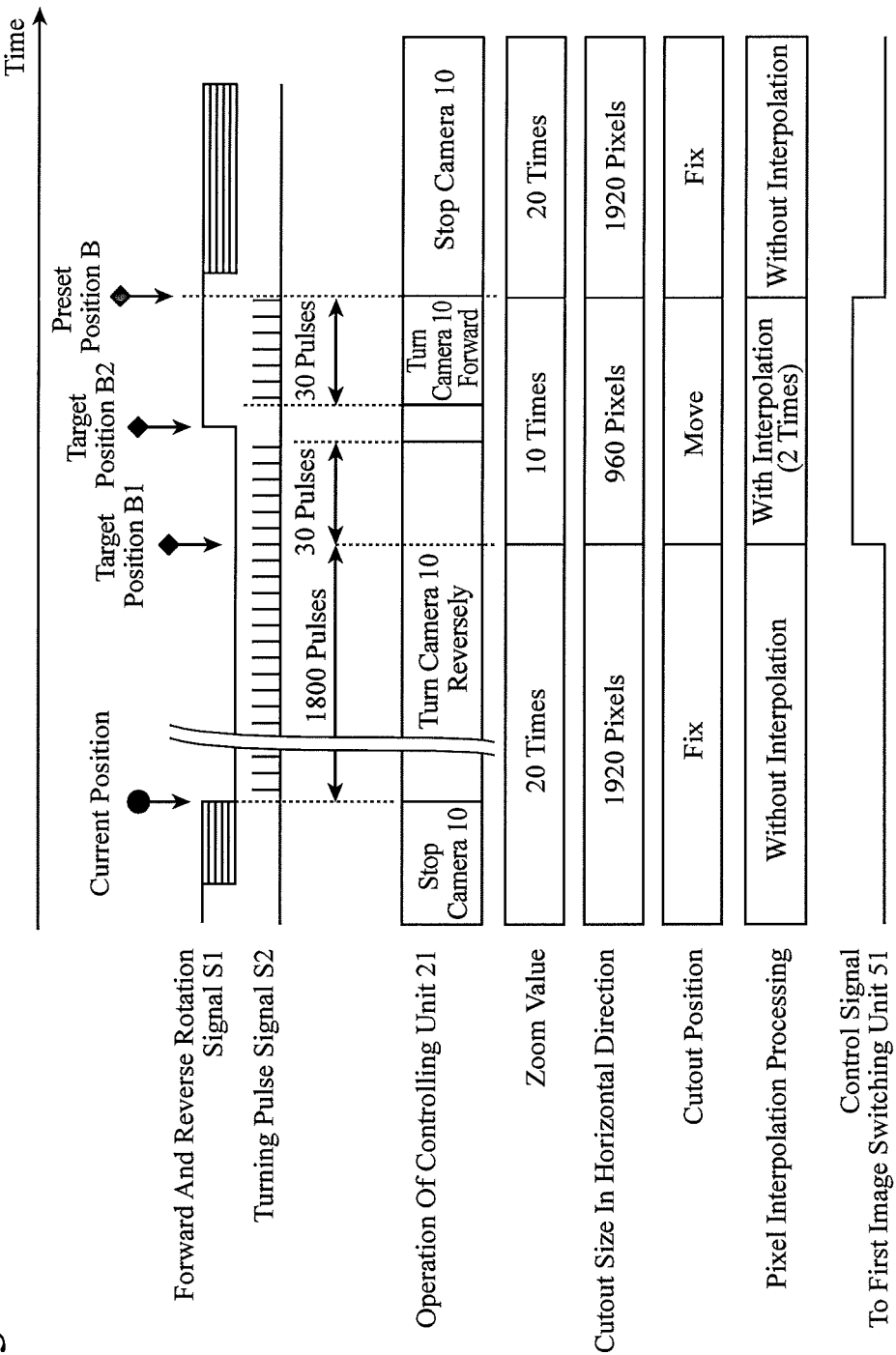
FIG. 23 is a timing chart corresponding to the flowcharts of FIGS. 21 and 22.

FIG. 23 illustrates a timing chart until the camera 10 reaches the preset position B in the above-mentioned way.

As can be seen from the above, the image pickup device 1 according to the second embodiment can display on the monitor 42 an image as if the camera 10 stopped at the target position B1 while the position of the camera 10 is adjusted from the target position B1 to the target position B2 and then from the target position B2 to the preset position B, without being affected by the zoom value of the lens 11, the resolution performance of the image pickup unit 13, and the like.

Note that, in the above, the case has been described where the processing in steps ST140 to ST146 is performed after the camera 10 reaches the target position B1. However, the processing in those may be performed before the camera 10 reaches the target position B1 Even in this way, a similar effect can be obtained.

In addition, in the above, the case has been described where the processing in steps ST140 to ST146 is performed immediately after the camera 10 reaches the target position B1. However, the processing in those may be performed during turning operation of the camera 10 from the target position B1 to the preset position B. In this case, when the image cutout unit 15 outputs the image data corresponding to the area whose position in the photographing range of the camera 10 is moved during the turning operation of the camera 10 by the offset pulse, it is sufficient that, while the area does not deviate from the photographing range even when the area is moved, the zoom value Zc of the lens 11 is fixed and the processing in steps ST142 to ST146 is not performed, and when the area deviates from the photographing range, the zoom value of the lens 11 is set to a slightly wide angle side value and then the processing in steps ST142 to ST146 is repeatedly performed. Even in this way, a similar effect can be obtained.

As described above, the image pickup device 1 according to the second embodiment can obtain an effect similar to that in the first embodiment without being affected by the zoom value of the lens 11, the resolution performance of the image pickup unit 13, and the like.

Third Embodiment

Figure 25:
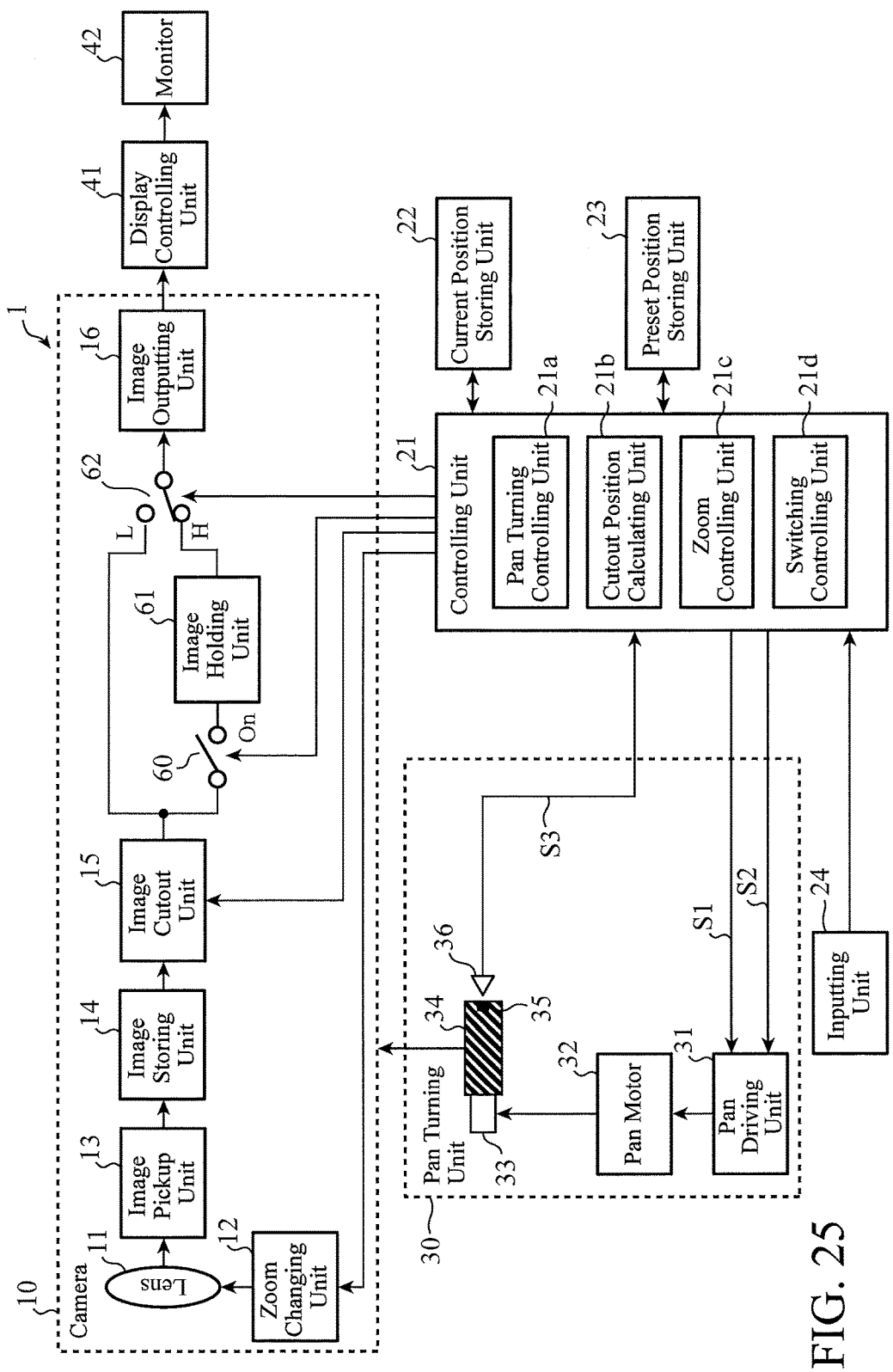
FIG. 25 is a configuration diagram of an image pickup device according to a third embodiment of the present invention.

FIG. 25 is a configuration diagram of an image pickup device 1 according to a third embodiment of the present invention. Components that are the same as or equivalent to those described in the first and second embodiments are denoted by the same reference numerals, and the description thereof is omitted or simplified.

The image pickup device 1 according to the third embodiment includes a second image switching unit 60, an image holding unit 61, and a third image switching unit 62 between the image cutout unit 15 and the image outputting unit 16.

The second image switching unit 60 is a changeover switch for switching whether or not to output image data output by the image cutout unit 15 to the image holding unit 61.

The image holding unit 61 acquires the image data output by the image cutout unit 15 via the second image switching unit 60, and holds the image data as still image data. The image holding unit 61 includes one of various memories similarly to the memory 101.

The third image switching unit 62 is a changeover switch for selectively switching and outputting the image data output by the image cutout unit 15 and the still image data held by the image holding unit 61 to the image outputting unit 16. The image outputting unit 16 outputs one of the image data and the still image data selectively output by the third image switching unit 62 to the display controlling unit 41. The display controlling unit 41 displays an image indicated by the image data output by the image outputting unit 16 on the monitor 42.

The switching controlling unit 21d controls switching operation of the second image switching unit 60 and the third image switching unit 62.

In the third embodiment, a display control device is configured by the image holding unit 61, the third image switching unit 62, and the display controlling unit 41. In addition, instead of the configuration illustrated in FIG. 25, a single display control device may be configured by the image holding unit 61, the third image switching unit 62, and the display controlling unit 41, and communicably connected to the monitor 42 and also to the camera 10 and the controlling unit 21 both of which are configured by excluding the components of the single display control device.

Next, with reference to a flowchart illustrated in FIG. 26 and a timing chart illustrated in FIG. 27, an example will be described of preset operation of the image pickup device 1 according to the third embodiment configured as described above.

The preset operation in the case of turning the camera 10 in the forward rotational direction to the preset position A as illustrated in FIG. 8 is as already described in steps ST120 to ST128 of FIG. 7, so that the description thereof is omitted. In the following description, preset operation will be described in the case of turning the camera 10 in the reverse rotational direction to the preset position B as illustrated in FIG. 11.

When it is determined that the turning direction of the camera 10 is the reverse rotational direction by the processing in steps ST120 to ST124 already described with reference to FIG. 7 (step ST124; NO), the processing in step ST130 illustrated in FIG. 26 is subsequently performed. Since the processing in steps ST130 to ST132 is as already described with reference to FIG. 10, the description thereof is omitted.

Note that, during steps ST131 and ST132, a state is set in which the second image switching unit 60 is turned off and the third image switching unit 62 outputs the image data output by the image cutout unit 15 to the image outputting unit 16. Therefore, until the camera 10 reaches the target position B1, the third image switching unit 62 outputs the image data output by the image cutout unit 15.

When the turning pulse signal S2 has been output by an amount corresponding to the turning angle (step ST132; YES), that is, when the camera 10 reaches the target position B1, the image holding unit 61 acquires the image data output by the image cutout unit 15 for one frame, and holds the image data as still image data (step ST150). This is performed by outputting a control signal to turn on the second image switching unit 60 from the switching controlling unit 21*d*. When the image data for one frame is held in the image holding unit 61, the switching controlling unit 21*d* outputs a control signal to turn off the second image switching unit 60.

Subsequently, the third image switching unit 62 outputs the still image data held by the image holding unit 61 to the image outputting unit 16 (step ST151). This is performed by outputting a control signal to the third image switching unit 62 to control its switching operation from the switching controlling unit 21*d*. The switching operation of the third image switching unit 62 set at this time is maintained until it is changed in step ST152 described later.

Then, the processing in steps ST133 and ST135 already described in the first embodiment is performed, and until the turning pulse signal S2 is output by the number of offset pulses (step ST135; YES), that is, until the camera 10 reaches the target position B2 from the target position B1, an image indicated by the still image data which is photographed at the target position B1 and acquired in step ST150 is displayed on the monitor 42 by the display controlling unit 41 receiving the output from the image outputting unit 16.

Subsequently, when the camera 10 reaches the target position B2 (step ST135; YES), the camera 10 turns in the forward rotational direction toward the preset position B by the processing in step ST136 already described in the first embodiment. Also during this turning, the third image switching unit 62 outputs the still image data held by the image holding unit 61 to the image outputting unit 16. Therefore, on the monitor 42, the image indicated by the still image data which is photographed at the target position B1 and acquired in step ST150 continues being displayed by the display controlling unit 41 receiving the output from the image outputting unit 16.

Subsequently, when the camera 10 is turned in the forward rotational direction and then the turning pulse signal S2 has been output by the number of offset pulses (step ST138; YES), that is, when the camera 10 reaches the preset position B, the third image switching unit 62 outputs, to the image outputting unit 16, the image data output by the image cutout unit 15 instead of the still image data held by the image holding unit 61 (step ST152). This is performed by outputting a control signal to the third image switching unit 62 to control its switching operation from the switching controlling unit 21*d*.

Therefore, after the camera 10 reaches the preset position B, a real-time image photographed at the preset position B is displayed on the monitor 42 by the display controlling unit 41.

As described above, while the position of the camera 10 is adjusted from the target position B1 to the target position B2 and then from the target position B2 to the preset position B, the image displayed on the monitor 42 is the image acquired when the camera 10 reaches the target position B1. Therefore, shaking is reduced of the image displayed on the monitor 42 while the camera 10 turns from the target position B1 to the preset position B, and thus a satisfactory image is provided to the user.

In the above description, only when the camera 10 reaches the target position B1, the processing is performed in which the second image switching unit 60 is turned on and the image holding unit 61 acquires and holds the image data output by the image cutout unit 15. However, also in other cases, the second image switching unit 60 may be turned on, the image data output by the image cutout unit 15 may be acquired and held by the image holding unit 61, and the third image switching unit 62 may output the image data held by the image holding unit 61 to the image outputting unit 16.

Processing in such a case will be described with reference to FIG. 28.

In a case where an interval at which the second image switching unit 60 is turned on is set to one second, for example, and the third image switching unit 62 always outputs the image data held by the image holding unit 61 to the image outputting unit 16, the image displayed on the monitor 42 by the display controlling unit 41 is an image thinned out every one second.

Figure 26:
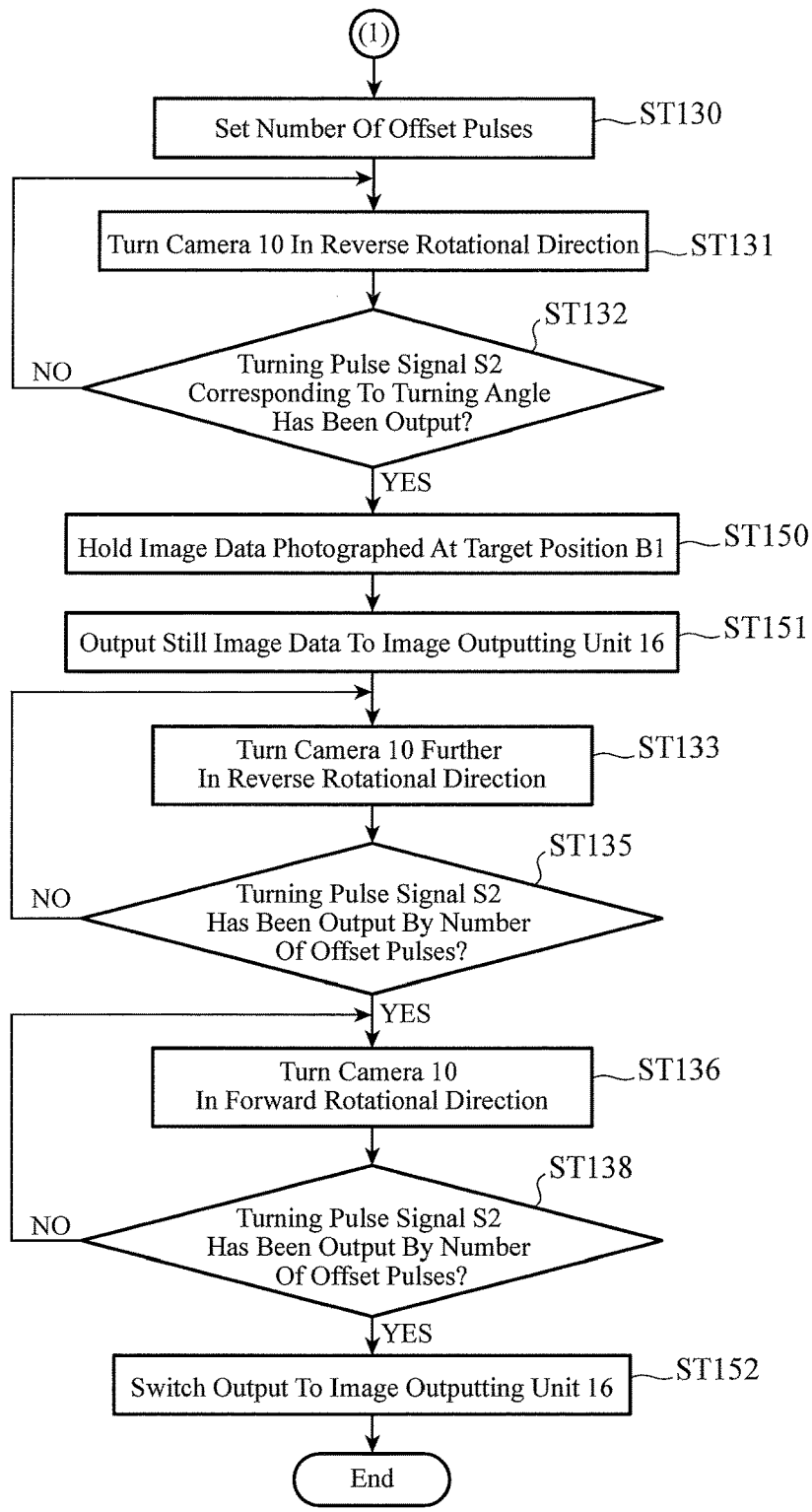
FIG. 26 is a flowchart illustrating processing performed by the image pickup device according to the third embodiment of the present invention.
Figure 27:
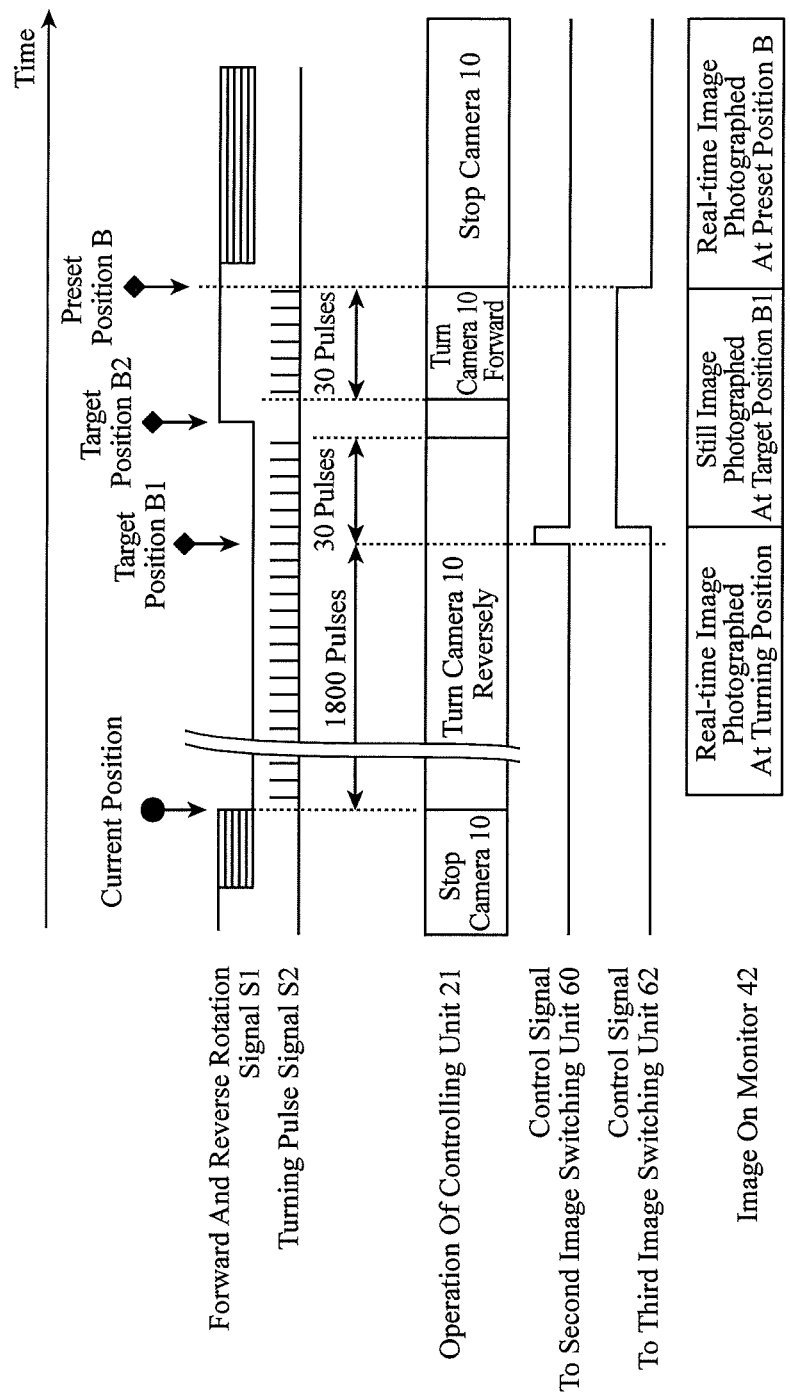
FIG. 27 is a timing chart corresponding to the flowchart of FIG. 26.

In this case, to display the image photographed at the target position B1 on the monitor 42 during the period from step ST150 to step ST138 of FIG. 26, the second image switching unit 60 is desirably turned on at the timing when the camera 10 reaches the target position B1. For this purpose, under the condition that the image acquired by the camera 10 is thinned out every one second, it is sufficient that the turning start timing and the turning speed of the camera 10 is adjusted so that the time until the camera 10 reaches the target position B1 from the current position at which turning in the reverse rotational direction is started is one second basis, that is, thinning out time T×n. The thinning out time T is one second in this example, and n is a freely-selected positive integer.

Figure 28:
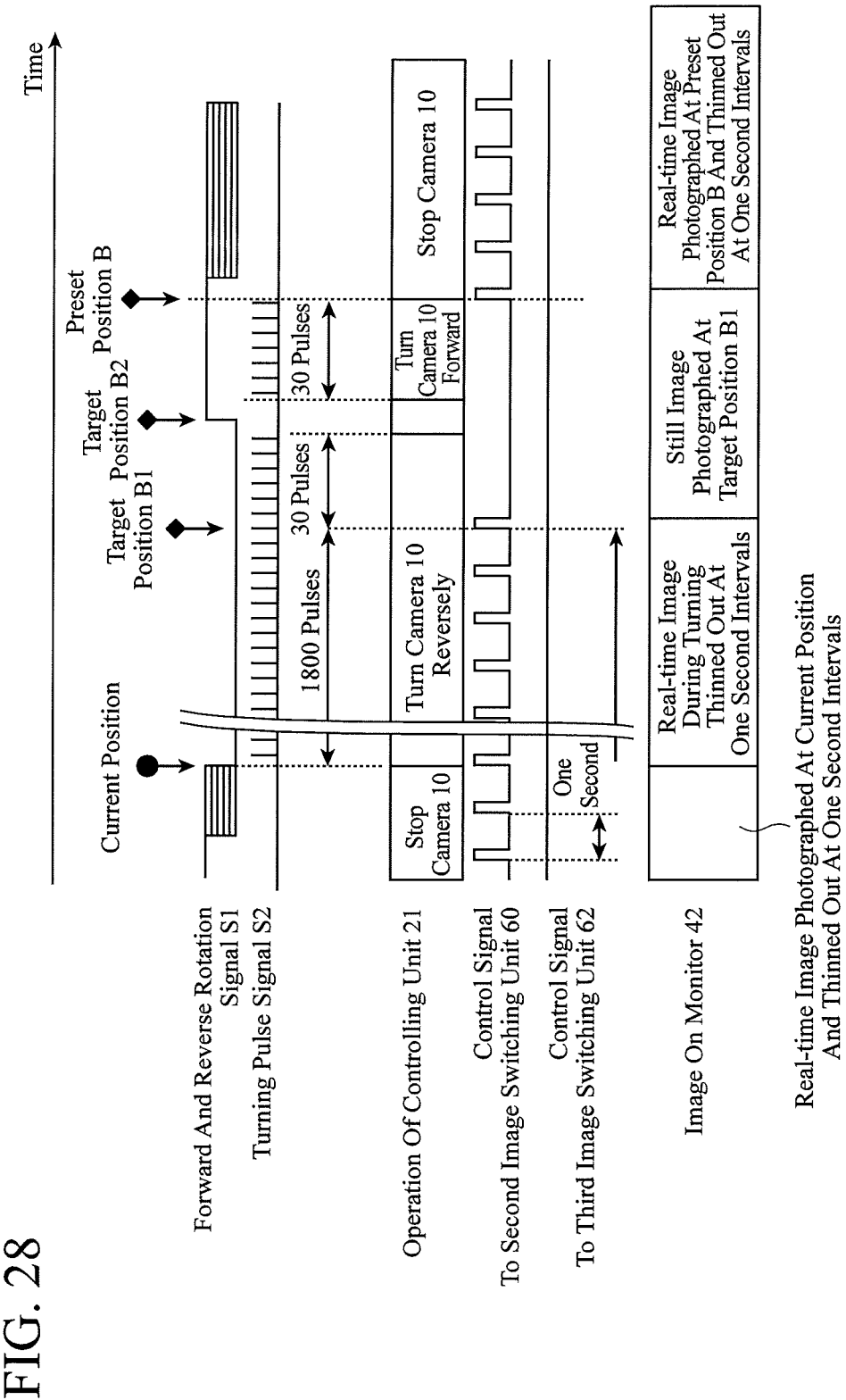
FIG. 28 is a timing chart corresponding to other processing performed by the image pickup device according to the third embodiment of the present invention.
Figure 29:
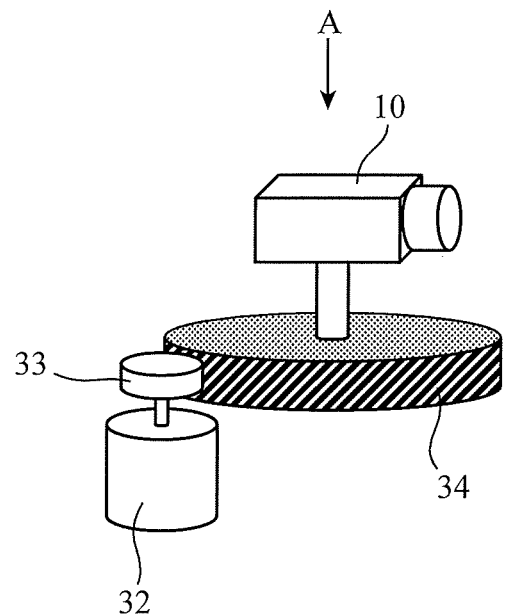
FIG. 29 is a diagram illustrating the camera and a mechanism for turning the camera.
Figure 30:
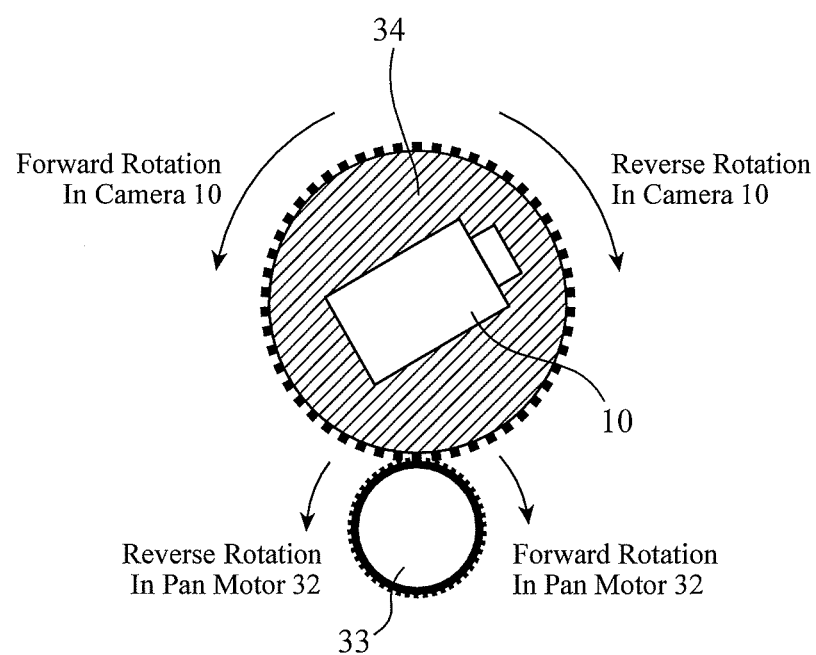
FIG. 30 is a diagram of the camera and the mechanism for turning the camera in FIG. 29, as viewed from a direction A.

As illustrated in FIG. 28, first, the pan turning controlling unit 21*a* starts turning the camera 10 in the reverse rotational direction from the current position at the timing when the second image switching unit 60 is turned on. In a case where the time until the camera 10 reaches the target position B1 from the current position is set to three seconds, the pan turning controlling unit 21*a* calculates an average pulse interval of the turning pulse signal S2 as indicated in expression (3) below.

$$3 \text{ seconds}/1800 \text{ pulses} = 1.67 \text{ milliseconds} \tag{3}$$

When the pan turning controlling unit 21*a* outputs the turning pulse signal S2 at intervals calculated as in the expression (3), the second image switching unit 60 is turned on at the timing when the camera 10 reaches the target position B1, and thus the image data photographed at the target position B1 output by the image cutout unit 15 at that time is held in the image holding unit 61.

Until the camera 10 reaches the target position B1, the image holding unit 61 acquires and holds the image data output by the image cutout unit 15 periodically, every one second in this example.

Then, while the camera 10 reaches the target position B1 and then turns to the target position B2 and then turns from the target position B2 to the preset position B, similarly to the processing illustrated in FIG. 26, the second image switching unit 60 is turned off, and thus the image data acquired by the image holding unit 61 at the timing when the camera 10 reaches the target position B1 continues being held. Therefore, while the camera 10 reaches the target position B1 and then turns to the target position B2 and then turns from the target position B2 to the preset position B, the image indicated by the image data acquired at the target position B1 is displayed on the monitor 42.

Then, when the camera 10 reaches the preset position B, the switching controlling unit 21*d* performs control so that the second image switching unit 60 is turned on at one second intervals and also the third image switching unit 62 continues outputting the image data held by the image holding unit 61 to the image outputting unit 16. As a result, on the monitor 42, the real-time image which is photographed at the preset position B and thinned out every one second is displayed.

As described above, while the position of the camera 10 is adjusted from the target position B1 to the target position B2 and then from the target position B2 to the preset position B, the image displayed on the monitor 42 is the image acquired when the camera 10 reaches the target position B1. Therefore, shaking is reduced of the image displayed on the monitor 42 while the camera 10 turns from the target position B1 to the preset position B, and thus a satisfactory image is provided to the user.

Note that, in the above description, the expression (3) and the like are used, whereby the second image switching unit 60 is turned on at the timing when the camera 10 reaches the target position B1. However, for some reason, when the camera 10 reaches the target position B1 while the second image switching unit 60 is turned off, the switching controlling unit 21*d* may perform control so that the second image switching unit 60 is forcibly turned on at the timing when the target position B1 is reached.

In addition, when the camera 10 is an IP camera and the image is thinned out for each set time, for example, one second, an intra frame of encoded data may be output.

In addition, FIG. 25 illustrates a configuration in which the image cutout unit 15 is provided. However, the image pickup device 1 according to the third embodiment does not have to include the image cutout unit 15. In this case, the image data to be processed by units between the image storing unit 14 and the display controlling unit 41 is all the image data corresponding to the photographing range of the camera 10. Whether the image cutout unit 15 is provided or not, it can be said that the photographed image data of the camera 10 is input to the image holding unit 61 and the third image switching unit 62.

As described above, with the image pickup device 1 according to the third embodiment, the stop position error due to the backlash can be eliminated even when the camera 10 is turned in the reverse rotational direction to reach the preset position B. At that time, the shaking is reduced of the image displayed on the monitor 42 while the camera 10 is turned in the reverse rotational direction and the forward rotational direction by the offset pulse, and thus a satisfactory image is provided to the user.

Note that, in the invention of the present application, within the scope of the invention, free combination of each embodiment, a modification of any component of each embodiment, or omission of any component in each embodiment is possible.

INDUSTRIAL APPLICABILITY

As described above, the display control device according to the present invention can reduce the shaking of the image displayed when the stop position accuracy of the camera is improved, so that it is suitable for use with a turning type camera for monitoring having a preset function, for example.

REFERENCE SIGNS LIST

1: Image pickup device, 10: Camera, 11: Lens, 12: Zoom changing unit, 13: Image pickup unit, 14: Image storing unit, 15: Image cutout unit, 16: Image outputting unit, 21: Controlling unit, 21*a*: Pan turning controlling unit, 21*b*: Cutout position calculating unit, 21*c*: Zoom controlling unit, 21*d*: Switching controlling unit, 22: Current position storing unit, 23: Preset position storing unit, 24: Inputting unit, 30: Pan turning unit, 31: Pan driving unit, 32: Pan motor, 33: Worm, 34: Worm wheel, 35: Origin generating unit, 36: Origin detecting unit, 41: Display controlling unit, 42: Monitor, 50: Image pixel interpolating unit, 51: First image switching unit, 60: Second image switching unit, 61: Image holding unit, 62: Third image switching unit, 100: Processing circuit, 101: Memory, 102: CPU.

The invention claimed is:

1. A display control device comprising:
    an image cutout unit for outputting image data corresponding to a partial area of a photographing range of a camera, the camera being turned by rotational force transmitted by tooth engagement in a rotational force transmission mechanism in a first rotational direction used for regulating a position of the camera and a second rotational direction opposite to the first rotational direction;
    a cutout position calculating unit for calculating an amount of movement of the photographing range corresponding to an amount of turning of the camera; and
    a display controlling unit for displaying an image indicated by the image data corresponding to the area, wherein
    the image cutout unit,
    until the camera turning in the second rotational direction reaches a first position, outputs image data corresponding to the area whose position in the photographing range is fixed at a set position,
    from when the camera reaches the first position and then further turns in the second rotational direction by a set angle and further turns in the first rotational direction by the set angle until the camera reaches a second position, outputs image data corresponding to the area whose position in the photographing range is moved in a direction of canceling movement of the area linked with turning of the camera by using the amount of movement calculated by the cutout position calculating unit, and when the camera reaches the second position, outputs image data corresponding to the area whose position in the photographing range is fixed at the set position.

2. The display control device according to claim 1, further comprising:

a zoom controlling unit for setting a zoom value of the camera; and an image pixel interpolating unit for performing pixel interpolation processing on image data, wherein in a case where the area deviates from the photographing range when a position of the area in the photographing range is moved in the direction of canceling the movement of the area linked with the turning of the camera by using the amount of movement calculated by the cutout position calculating unit, the zoom controlling unit changes the zoom value to a value on a wide angle side, the image cutout unit outputs image data corresponding to the area whose size in the photographing range is reduced in accordance with change in the zoom value, the image pixel interpolating unit performs pixel interpolation processing on the image data output by the image cutout unit, and the display controlling unit displays an image indicated by image data subjected to the pixel interpolation processing.

3. A display control device comprising:

an image holding unit for acquiring and holding photographed image data of a camera as still image data, the camera being turned by rotational force transmitted by tooth engagement in a rotational force transmission mechanism in a first rotational direction used for regulating a position of the camera and a second rotational direction opposite to the first rotational direction;

an image switching unit for switching and outputting photographed image data of the camera and the still image data held by the image holding unit; and a display controlling unit for displaying an image indicated by image data output by the image switching unit, wherein the image holding unit, when the camera turning in the second rotational direction reaches a first position, acquires and holds photographed image data of the camera as still image data, and the image switching unit, until the camera turning in the second rotational direction reaches the first position, outputs photographed image data of the camera, from when the camera reaches the first position and then further turns in the second rotational direction by a set angle and further turns in the first rotational direction by the set angle until the camera reaches a second position, outputs the still image data held by the image holding unit, and when the camera reaches the second position, outputs photographed image data of the camera.

4. A display control device comprising:

an image holding unit for acquiring and holding photographed image data of a camera, the camera being turned by rotational force transmitted by tooth engagement in a rotational force transmission mechanism in a first rotational direction used for regulating a position of the camera and a second rotational direction opposite to the first rotational direction; and a display controlling unit for displaying an image indicated by the image data held by the image holding unit, wherein the image holding unit, until the camera turning in the second rotational direction reaches a first position, periodically acquires and holds photographed image data of the camera, when the camera reaches the first position, acquires and holds photographed image data of the camera, and until the camera further turns in the second rotational direction by a set angle and further turns in the first rotational direction by the set angle and reaches a second position, continues holding the photographed image data acquired when the camera reaches the first position, and when the camera reaches the second position, periodically acquires and holds photographed image data of the camera.

5. An image pickup device comprising the display control device according to claim 1.

6. An image pickup device comprising the display control device according to claim 3.

7. An image pickup device comprising the display control device according to claim 4.

* * * * *